US012812614B2

(12) United States Patent
Hosseini et al.

(10) Patent No.: US 12,812,614 B2
(45) Date of Patent: Nov. 24, 2026

(54) TECHNIQUES FOR COMMUNICATIONS WITHIN DYNAMIC GUARD BANDS

(71) Applicant: QUALCOMM Incorporated, San Diego, CA (US)

(72) Inventors: Kianoush Hosseini, San Diego, CA (US); Jing Jiang, San Diego, CA (US); Vinayak Suresh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/335,951

(22) Filed: Jun. 15, 2023

(65) Prior Publication Data

US 2024/0422751 A1 Dec. 19, 2024

(51) Int. Cl.
*H04W 72/23* (2023.01)
*H04L 27/26* (2006.01)
*H04W 72/0453* (2023.01)
*H04W 72/51* (2023.01)

(52) U.S. Cl.
CPC ..... *H04W 72/0453* (2013.01); *H04L 27/2605* (2013.01); *H04W 72/51* (2023.01)

(58) Field of Classification Search
CPC . H04W 72/0453; H04W 72/51; H04W 72/23; H04W 27/2605; H04L 5/0094; H04L 5/0044
USPC .......................................................... 370/329
See application file for complete search history.

(56) References Cited

U.S. PATENT DOCUMENTS 9,860,048 B2 1/2018 Lim et al.
11,171,756 B2 * 11/2021 Barbu ........................ H04L 5/14
11,711,250 B2 * 7/2023 Cheng ................... H04L 5/0044 375/262
12,262,401 B2 * 3/2025 Zhao ................... H04L 27/0006
(Continued)

FOREIGN PATENT DOCUMENTS

WO WO-2020236929 A1 11/2020

OTHER PUBLICATIONS

5G; NR; Physical channels and modulation (3GPP TS 38.211 version 17.4.0 Release 17) NR; Physical channels and modulation (Year: 2023).*
(Continued)

*Primary Examiner* — Christopher M Crutchfield
*Assistant Examiner* — Syed M Ahmed
(74) *Attorney, Agent, or Firm* — QUALCOMM Incorporated

(57) ABSTRACT

Methods, systems, and devices for wireless communications are described. A user equipment (UE) may receive, from a network entity, control signaling indicating a communication frame structure for communications between the UE and the network entity, where the communication frame structure includes a guard band between a first channel and a second channel in a frequency domain. The UE may receive a control message indicating a set of resources for a message between the UE and the network entity, where at least a subset of resources of the set of resources are included within the guard band. The UE may then communicate the message with the network entity within the set of resources and in accordance with a set of parameters that satisfy one or more conditions for performing communications within the guard band.

30 Claims, 14 Drawing Sheets

(56) References Cited

U.S. PATENT DOCUMENTS

| | | | | |
|---|---|---|---|---|
| 2015/0181583 | A1* | 6/2015 | Siomina | H04W 72/044 370/330 |
| 2016/0128072 | A1* | 5/2016 | Rajagopal | H04L 5/0091 370/329 |
| 2017/0257864 | A1* | 9/2017 | Kakishima | H04W 72/23 |
| 2018/0220378 | A1* | 8/2018 | Lim | H04W 52/367 |
| 2020/0313824 | A1* | 10/2020 | Barbu | H04L 5/001 |
| 2021/0288852 | A1 | 9/2021 | Jia et al. | |
| 2022/0303981 | A1* | 9/2022 | Sakhnini | H04W 72/51 |
| 2022/0407663 | A1* | 12/2022 | Tooher | H04L 5/0098 |
| 2025/0119194 | A1* | 4/2025 | You | H04L 5/1469 |
| 2025/0227713 | A1* | 7/2025 | Noh | H04W 72/0453 |
| 2025/0247831 | A1* | 7/2025 | Nunome | H04L 5/0053 |
| 2025/0247884 | A1* | 7/2025 | Kusashima | H04W 16/14 |

OTHER PUBLICATIONS

5G; NR; Physical layer procedures for control (3GPP TS 38.213 version 17.5.0 Release 17) NR; Physical layer procedures for control (Year: 2023).*

5G; NR; Physical layer procedures for data (3GPP TS 38.214 version 17.5.0 Release 17) NR; Physical layer procedures for data (Year: 2023).*

Huawei, et al., "Corrections on the Wideband Operation Procedures", 3GPP TSG RAN WG1 Meeting #100-e, R1-2000201, 3rd Generation Partnership Project, Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020, 7 Pages, XP051853197, sections 1-3.

International Search Report and Written Opinion—PCT/US2024/031891—ISA/EPO—Oct. 1, 2024.

* cited by examiner

TECHNIQUES FOR COMMUNICATIONS WITHIN DYNAMIC GUARD BANDS

FIELD OF TECHNOLOGY

The following relates to wireless communications, including techniques for communications within dynamic guard bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless networks utilize "guard bands" between communication channels (e.g., carriers) in order to reduce interference between adjacent channels (e.g., reduce adjacent channel interference (ACI)). That is, guard bands may be positioned between communication channels in the frequency domain to prevent communications on one channel from "leaking" into another channel, thereby causing ACI. While the use of guard bands may help prevent or alleviate ACI, the use of guard bands may reduce the amount/proportion of resources that are available for communications, thereby reducing the possible throughput within the network.

SUMMARY

The described techniques relate to improved methods, systems, devices, and apparatuses that support techniques for communications within dynamic guard bands. Generally, aspects of the present disclosure are directed to techniques that enable guard bands to be dynamically used for communications. In particular, aspects of the present disclosure are directed to rules or configurations that enable communications to be scheduled within guard bands when specific parameters are used to perform the communications, and/or when certain conditions are satisfied. For example, a user equipment (UE) may receive control signaling (e.g., radio resource control (RRC) signaling) that indicates a communication frame structure for communications between the UE and the network. The communication frame structure may include multiple channels that are separated in the frequency domain by a guard band. Subsequently, the UE may receive a control message (e.g., downlink control information (DCI) message) that schedules a message between the UE and the network that at least partially overlaps with the guard band. The UE may then perform the message within the guard band using a set of parameters that satisfy one or more conditions for performing communications within the guard band.

A method is described. The method may include receiving, from a network entity, control signaling indicating a communication frame structure for communications between the UE and the network entity, where the communication frame structure includes a guard band between a first channel and a second channel in a frequency domain, receiving a control message indicating a set of resources for a message between the UE and the network entity, where at least a subset of resources of the set of resources are included within the guard band, and communicating the message with the network entity within the set of resources and in accordance with a set of parameters that satisfy one or more conditions for performing communications within the guard band.

An apparatus is described. The apparatus may include one or more processors, one or more memories coupled with the one or more processors, and instructions stored in the one or more memories. The instructions may be executable by the one or more processors to cause the apparatus to receive, from a network entity, control signaling indicating a communication frame structure for communications between the UE and the network entity, where the communication frame structure includes a guard band between a first channel and a second channel in a frequency domain, receive a control message indicating a set of resources for a message between the UE and the network entity, where at least a subset of resources of the set of resources are included within the guard band, and communicate the message with the network entity within the set of resources and in accordance with a set of parameters that satisfy one or more conditions for performing communications within the guard band.

Another apparatus is described. The apparatus may include means for receiving, from a network entity, control signaling indicating a communication frame structure for communications between the UE and the network entity, where the communication frame structure includes a guard band between a first channel and a second channel in a frequency domain, means for receiving a control message indicating a set of resources for a message between the UE and the network entity, where at least a subset of resources of the set of resources are included within the guard band, and means for communicating the message with the network entity within the set of resources and in accordance with a set of parameters that satisfy one or more conditions for performing communications within the guard band.

A non-transitory computer-readable medium storing code is described. The code may include instructions executable by one or more processors to receive, from a network entity, control signaling indicating a communication frame structure for communications between the UE and the network entity, where the communication frame structure includes a guard band between a first channel and a second channel in a frequency domain, receive a control message indicating a set of resources for a message between the UE and the network entity, where at least a subset of resources of the set of resources are included within the guard band, and communicate the message with the network entity within the set of resources and in accordance with a set of parameters that satisfy one or more conditions for performing communications within the guard band.

Some examples of the method, apparatuses, and non-transitory computer-readable medium described herein may further include operations, features, means, or instructions for transmitting, to the network entity, capability signaling indicating a capability of the UE to perform communications within the guard band in accordance with the one or more conditions, where receiving the control message, communicating the message, or both, may be based on the capability signaling.

Some examples of the method, apparatuses, and non-transitory computer-readable medium described herein may further include operations, features, means, or instructions for transmitting, via the capability signaling, an indication of a modulation scheme, a modulation order, or both, that may be supported by the UE, where the message may be communicated in accordance with the modulation scheme, the modulation order, or both, and where the set of parameters include the modulation scheme, the modulation order, or both.

Some examples of the method, apparatuses, and non-transitory computer-readable medium described herein may further include operations, features, means, or instructions for receiving, via the control signaling, the control message, or both, a set of transmission time intervals, a set of frequency resources, or both, that may be enabled for communications within one or more guard bands, where the message may be communicated within a transmission time interval of the set of transmission time intervals, within the set of frequency resources, or both.

Some examples of the method, apparatuses, and non-transitory computer-readable medium described herein may further include operations, features, means, or instructions for receiving, via the control signaling, the control message, or both, an indication of the set of parameters, an indication of the one or more conditions, or both, where communicating the message may be based on receiving the indication of the set of parameters, the indication of the one or more conditions, or both.

Some examples of the method, apparatuses, and non-transitory computer-readable medium described herein may further include operations, features, means, or instructions for receiving, via the control message, one or more frequency domain resource allocation (FDRA) bit field values that indicate the at least the subset of resources that may be included within the guard band.

In some examples of the method, apparatuses, and non-transitory computer-readable medium described herein, a quantity of FDRA bit fields included within the control message may be based on a quantity of resource blocks (RBs) of the guard band that may be available for scheduled communications.

In some examples of the method, apparatuses, and non-transitory computer-readable medium described herein, each FDRA bit field value of the one or more FDRA bit field values may be associated with one or more RBs of the guard band.

Some examples of the method, apparatuses, and non-transitory computer-readable medium described herein may further include operations, features, means, or instructions for receiving, via the control message, one or more additional bit field values, a scrambled cyclic redundancy check (CRC) portion, or both, where a mapping between the one or more FDRA bit field values and the at least the subset of resources that may be included within the guard band may be interpreted in accordance with the one or more additional bit field values, the scrambled CRC portion, or both.

In some examples of the method, apparatuses, and non-transitory computer-readable medium described herein, the control message includes a DCI message that may be associated with a DCI format for scheduling communications within the guard band.

In some examples of the method, apparatuses, and non-transitory computer-readable medium described herein, the one or more conditions for performing communications within the guard band include an adjacent channel interference (ACI) threshold, an adjacent channel leakage ratio (ACLR) threshold, or both and the set of parameters includes an ACI level that satisfies the ACI threshold, an ACLR that satisfies the ACLR threshold, or both.

In some examples of the method, apparatuses, and non-transitory computer-readable medium described herein, the one or more conditions for performing communications within the guard band include one or more duplexing modes, one or more modulation orders, one or more modulation schemes, or any combination thereof, that may be enabled for communications within the guard band and the set of parameters include a duplexing mode included within the one or more duplexing modes, a modulation order included within the one or more modulation orders, a modulation scheme included within the one or more modulation schemes, or any combination thereof.

In some examples of the method, apparatuses, and non-transitory computer-readable medium described herein, the one or more conditions for performing communications within the guard band include an arrangement of resources within the guard band and the set of parameters include the arrangement of resources within the guard band.

In some examples of the method, apparatuses, and non-transitory computer-readable medium described herein, the one or more conditions for performing communications within the guard band include a maximum power reduction (MPR) value for messages transmitted by the UE and the set of parameters include the MPR value.

In some examples of the method, apparatuses, and non-transitory computer-readable medium described herein, the one or more conditions for performing communications within the guard band include one or more waveforms that may be enabled for communications within the guard band and the set of parameters include a waveform that may be included within the one or more waveforms.

A method is described. The method may include transmitting, to a UE, control signaling indicating a communication frame structure for communications between the UE and the network entity, where the communication frame structure includes a guard band between a first channel and a second channel in a frequency domain, transmitting a control message indicating a set of resources for a message between the UE and the network entity, where at least a subset of resources of the set of resources are included within the guard band, and communicating the message with the UE within the set of resources and in accordance with a set of parameters that satisfy one or more conditions for performing communications within the guard band.

An apparatus is described. The apparatus may include one or more processors, one or more memories coupled with the one or more processors, and instructions stored in the one or more memories. The instructions may be executable by the at least on one or more processors to cause the apparatus to transmit, to a UE, control signaling indicating a communication frame structure for communications between the UE and the network entity, where the communication frame structure includes a guard band between a first channel and a second channel in a frequency domain, transmit a control message indicating a set of resources for a message between the UE and the network entity, where at least a subset of resources of the set of resources are included within the guard band, and communicate the message with the UE within the set of resources and in accordance with a set of parameters that satisfy one or more conditions for performing communications within the guard band.

Another apparatus is described. The apparatus may include means for transmitting, to a UE, control signaling indicating a communication frame structure for communications between the UE and the network entity, where the communication frame structure includes a guard band between a first channel and a second channel in a frequency domain, means for transmitting a control message indicating a set of resources for a message between the UE and the network entity, where at least a subset of resources of the set of resources are included within the guard band, and means for communicating the message with the UE within the set of resources and in accordance with a set of parameters that satisfy one or more conditions for performing communications within the guard band.

A non-transitory computer-readable medium storing code is described. The code may include instructions executable by one or more processors to transmit, to a UE, control signaling indicating a communication frame structure for communications between the UE and the network entity, where the communication frame structure includes a guard band between a first channel and a second channel in a frequency domain, transmit a control message indicating a set of resources for a message between the UE and the network entity, where at least a subset of resources of the set of resources are included within the guard band, and communicate the message with the UE within the set of resources and in accordance with a set of parameters that satisfy one or more conditions for performing communications within the guard band.

Some examples of the method, apparatuses, and non-transitory computer-readable medium described herein may further include operations, features, means, or instructions for receiving, from the UE, capability signaling indicating a capability of the UE to perform communications within the guard band in accordance with the one or more conditions, where transmitting the control message, communicating the message, or both, may be based on the capability signaling.

Some examples of the method, apparatuses, and non-transitory computer-readable medium described herein may further include operations, features, means, or instructions for receiving, via the capability signaling, an indication of a modulation scheme, a modulation order, or both, that may be supported by the UE, where the message may be communicated in accordance with the modulation scheme, the modulation order, or both, and where the set of parameters include the modulation scheme, the modulation order, or both.

Some examples of the method, apparatuses, and non-transitory computer-readable medium described herein may further include operations, features, means, or instructions for transmitting, via the control signaling, the control message, or both, a set of transmission time intervals, a set of frequency resources, or both, that may be enabled for communications within one or more guard bands, where the message may be communicated within a transmission time interval of the set of transmission time intervals, within the set of frequency resources, or both.

Some examples of the method, apparatuses, and non-transitory computer-readable medium described herein may further include operations, features, means, or instructions for transmitting, via the control signaling, the control message, or both, an indication of the set of parameters, an indication of the one or more conditions, or both, where communicating the message may be based on transmitting the indication of the set of parameters, the indication of the one or more conditions, or both.

Some examples of the method, apparatuses, and non-transitory computer-readable medium described herein may further include operations, features, means, or instructions for transmitting, via the control message, one or more FDRA bit field values that indicate the at least the subset of resources that may be included within the guard band.

In some examples of the method, apparatuses, and non-transitory computer-readable medium described herein, a quantity of FDRA bit fields included within the control message may be based on a quantity of RBs of the guard band that may be available for scheduled communications.

In some examples of the method, apparatuses, and non-transitory computer-readable medium described herein, each FDRA bit field value of the one or more FDRA bit field values may be associated with one or more RBs of the guard band.

Some examples of the method, apparatuses, and non-transitory computer-readable medium described herein may further include operations, features, means, or instructions for transmitting, via the control message, one or more additional bit field values, a scrambled CRC portion, or both, where a mapping between the one or more FDRA bit field values and the at least the subset of resources that may be included within the guard band may be interpreted in accordance with the one or more additional bit field values, the scrambled CRC portion, or both.

In some examples of the method, apparatuses, and non-transitory computer-readable medium described herein, the control message includes a DCI message that may be associated with a DCI format for scheduling communications within the guard band.

In some examples of the method, apparatuses, and non-transitory computer-readable medium described herein, the one or more conditions for performing communications within the guard band include an ACI threshold, an ACLR threshold, or both and the set of parameters includes an ACI level that satisfies the ACI threshold, an ACLR that satisfies the ACLR threshold, or both.

In some examples of the method, apparatuses, and non-transitory computer-readable medium described herein, the one or more conditions for performing communications within the guard band include one or more duplexing modes, one or more modulation orders, one or more modulation schemes, or any combination thereof, that may be enabled for communications within the guard band and the set of parameters include a duplexing mode included within the one or more duplexing modes, a modulation order included within the one or more modulation orders, a modulation scheme included within the one or more modulation schemes, or any combination thereof.

In some examples of the method, apparatuses, and non-transitory computer-readable medium described herein, the one or more conditions for performing communications within the guard band include an arrangement of resources within the guard band and the set of parameters include the arrangement of resources within the guard band.

In some examples of the method, apparatuses, and non-transitory computer-readable medium described herein, the one or more conditions for performing communications within the guard band include a maximum power reduction value for messages transmitted by the UE and the set of parameters include the maximum power reduction value.

In some examples of the method, apparatuses, and non-transitory computer-readable medium described herein, the one or more conditions for performing communications within the guard band include one or more waveforms that may be enabled for communications within the guard band and the set of parameters include a waveform that may be included within the one or more waveforms.

DETAILED DESCRIPTION

Some wireless networks utilize "guard bands" between carriers/communication channels in order to reduce interference between adjacent channels (e.g., reduce adjacent channel interference (ACI)). That is, guard bands may be positioned between communication channels in the frequency domain to prevent communications on one channel from "leaking" into another channel, thereby causing ACI. While the use of guard bands may help prevent or alleviate ACI, the use of guard bands may reduce the amount/proportion of resources that are available for communications, thereby reducing the possible throughput within the network. As such, there is a desire to reduce the amount of resources that are allocated to guard bands, while simultaneously preventing or reducing ACI within a network.

Accordingly, aspects of the present disclosure are directed to techniques that enable guard bands to be dynamically used for communications. In particular, aspects of the present disclosure are directed to rules and configurations that enable communications to be scheduled within guard bands when specific parameters are used to perform the communications, and/or when certain conditions are satisfied. For example, a user equipment (UE) may receive control signaling (e.g., radio resource control (RRC) signaling) that indicates a communication frame structure for communications between the UE and the network. The communication frame structure may include multiple channels that are separated in the frequency domain by a guard band. Subsequently, the UE may receive a control message (e.g., downlink control information (DCI) message) that schedules a message between the UE and the network that at least partially overlaps with the guard band. The UE may then perform the message within the guard band using a set of parameters that satisfy one or more conditions for performing communications within the guard band.

In some cases, the conditions/parameters for performing communications within the guard band may be explicitly indicated by the network, or implicitly determined by the UE (e.g., based on the message being scheduled within the guard band). Parameters/conditions that must be used or satisfied for performing communications within the guard band may include certain allowed waveforms or modulation schemes/orders, maximum power reduction (MPR) values, maximum allowable ACI thresholds, and the like. Similarly, in some cases, communications within guard bands may be enabled for some slots and/or some frequency ranges, but not for others.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for communications within dynamic guard bands.

Figure 1:
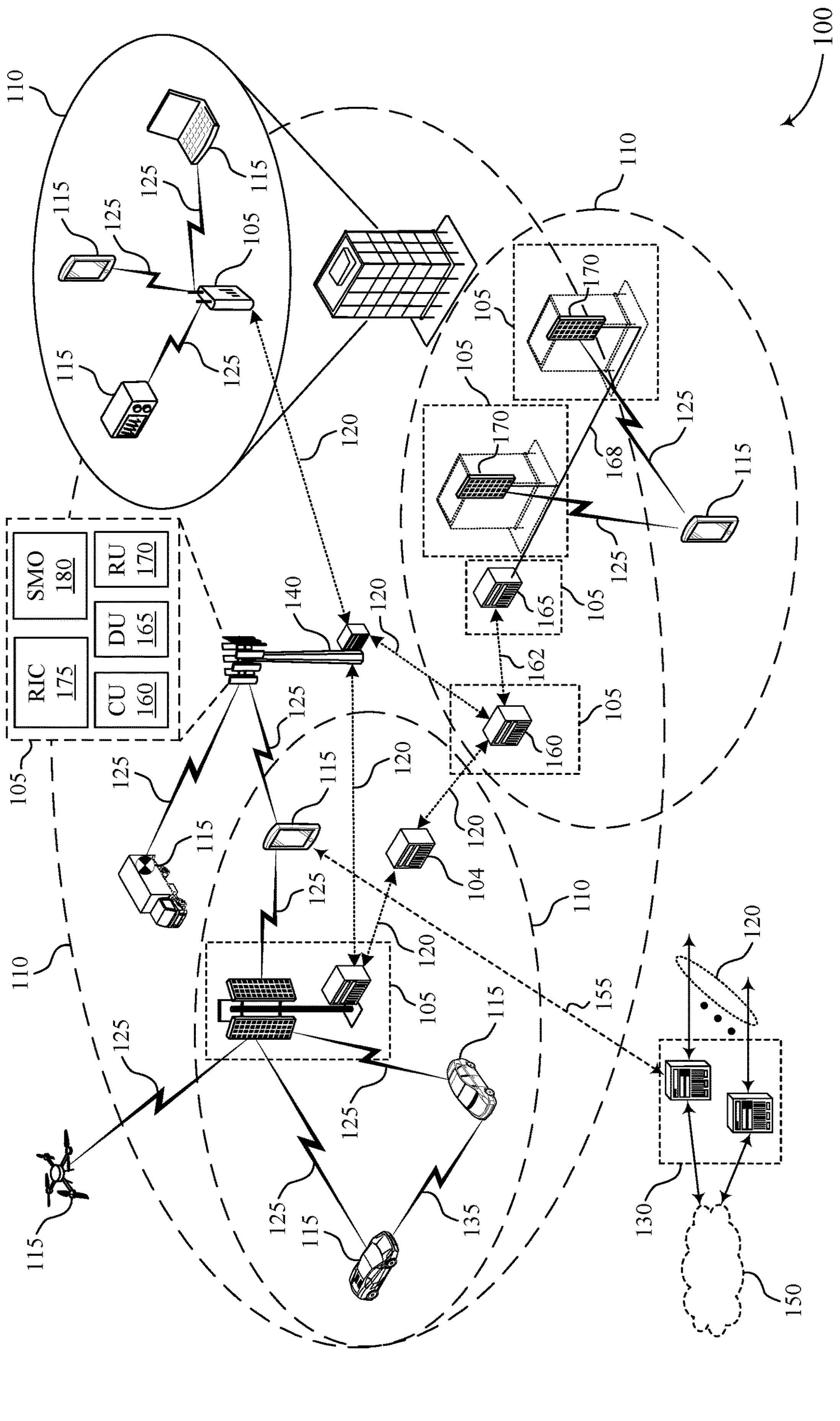
FIG. 1 shows an example of a wireless communications system that supports techniques for communications within dynamic guard bands in accordance with one or more aspects of the present disclosure.

FIG. 1 shows an example of a wireless communications system 100 that supports techniques for communications within dynamic guard bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for communications within dynamic guard bands as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UEs 115 and the network entities 105 of the wireless communications system 100 may support techniques that enable guard bands to be dynamically used for communications. In particular, the wireless communications system 100 may support rules and configurations that enable communications to be scheduled within guard bands when specific parameters are used to perform the communications, and/or when certain conditions are satisfied.

For example, a UE 115 of the wireless communications system 100 may receive control signaling (e.g., RRC signaling) that indicates a communication frame structure for communications between the UE 115 and the network. The communication frame structure may include multiple channels that are separated in the frequency domain by a guard band. Subsequently, the UE 115 may receive a control message (e.g., DCI message) that schedules a message between the UE 115 and the network that at least partially overlaps with the guard band. The UE 115 may then perform the message within the guard band using a set of parameters that satisfy one or more conditions for performing communications within the guard band.

In some cases, the conditions/parameters for performing communications within the guard band may be explicitly indicated by the network, or implicitly determined by the UE 115 (e.g., based on the message being scheduled within the guard band). Parameters/conditions that must be used or satisfied for performing communications within the guard band may include certain allowed waveforms or modulation schemes/orders, MPR values, maximum allowable ACI thresholds, and the like. Similarly, in some cases, communications within guard bands may be enabled for some slots and/or some frequency ranges, but not for others. For example, in some cases, network entities 105 may be configured to negotiate with one another to determine respective slots/time intervals and/or frequency ranges that are enabled for communications within guard bands for the respective network entities 105 (e.g., a first network entity 105 may schedule communications within guard bands for a first set of slots, where a second network entity 105 may schedule communications within guard bands for a second set of slots).

Techniques described herein may enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system 100. Additionally, techniques described herein may enable communications to be scheduled and performed within guard bands only when certain parameters are used, and/or when certain conditions or criteria are met. By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

Figure 2:
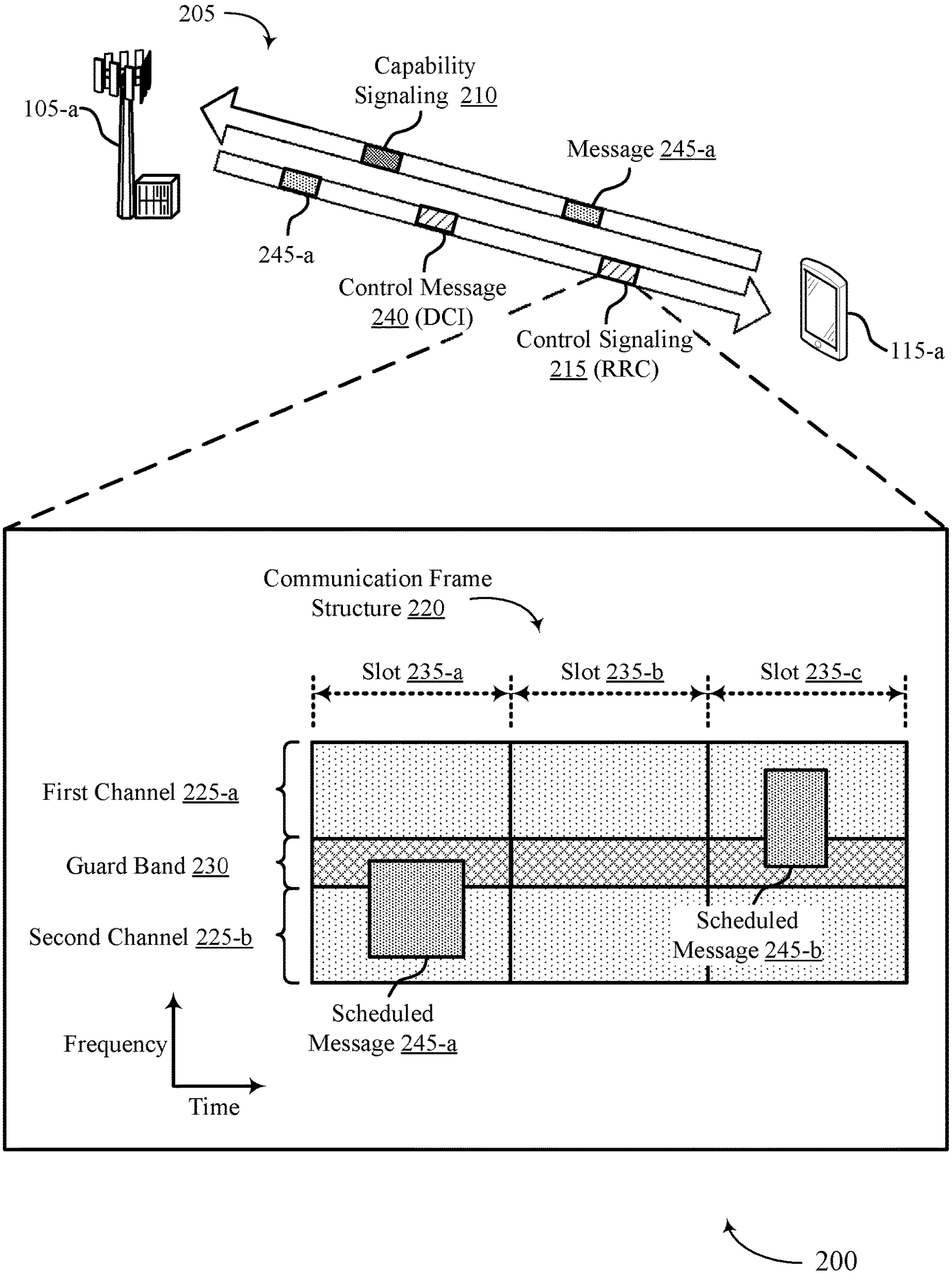
FIG. 2 shows an example of a wireless communications system that supports techniques for communications within dynamic guard bands in accordance with one or more aspects of the present disclosure.

FIG. 2 shows an example of a wireless communications system 200 that supports techniques for communications within dynamic guard bands in accordance with one or more aspects of the present disclosure. Aspects of the wireless communications system 200 may implement, or be implemented by, aspects of the wireless communications system 100. For example, the wireless communications system 200 illustrates signaling and configurations that enable the network to dynamically schedule communications within guard bands in such a manner that prevents such communications from detrimentally affecting adjacent channels, as described previously herein.

The wireless communications system 200 may include a UE 115-*a* and a network entity 105-*b*, which may be examples of UEs 115, network entities 105, and other wireless devices as described with reference to FIG. 1. In some aspects, the UE 115-*a* may communicate with the network entity 105-*a* via a communication link 205. In some cases, the communication link 205 may include an example of an access link (e.g., Uu link). The communication link 205 may include a bi-directional link that can include both uplink and downlink communication. For example, the UE 115-*a* may transmit uplink transmissions, such as uplink control signals or uplink data signals, to the network entity 105-*a* using the communication link 205, and the network entity 105-*a* may transmit downlink transmissions, such as downlink control signals or downlink data signals, to the UE 115-*a* using the communication link 205.

As noted previously herein, some wireless networks may utilize "guard bands" (e.g., guard band 230) between carriers/communication channels (e.g., channels 225) in order to reduce interference between adjacent channels 225 (e.g., reduce ACI). In other words, guard bands 230 may be used between carriers/communication channels 225 in order to control the level of interference imposed on one carrier/channel 225 due to transmissions in another carrier/channel 225. For example, as shown in FIG. 2, a guard band 230 may be positioned between a first channel 225-*a* and a second channel 225-*b* in the frequency domain to prevent communications within the first channel 225-*a* from "leaking" into the second channel 225-*b* (or vice versa), thereby causing ACI. In some cases, guard bands 230 may be budgeted such that the transmissions in one carrier/communication channel 225 decay to an acceptable level before they are seen by devices (e.g., UEs 115, network entities 105) in another carrier/communication channel 225.

For the purposes of the present disclosure, the terms "channel 225," "carrier," "band," and like terms, may be used to refer to a set of resources in the frequency domain that may be used to perform wireless communications. As such, the terms "channel 225," "carrier," "band," and like terms, may be used interchangeably herein.

While the use of guard bands 230 may help prevent or alleviate ACI. such guard bands 230 may reduce the amount/proportion of resources that are available for communications, thereby reducing the possible throughput within the network. As such, with the introduction of each new generation of cellular networks, there has been a push to reduce the proportion and/or size of guard bands 230. For example, approximately 23% of resources in 3G networks were occupied by guard bands 230, where this proportion was reduced to approximately 10% in 4G networks.

In the context of 5G networks, the proportion of resources occupied by guard bands 230 may be based on the frequency range (e.g., Frequency Range 1 (FR1), Frequency Range 2 (FR2), etc.), a bandwidth of the respective set of frequency resources, and the subcarrier spacing (SCS) of the respective set of resources. As such, in some 5G networks, the proportion of resources occupied by guard bands 230 may be approximately 2% in some cases, such as in the case of a 100 MHz channel 225 in FR1 with 30 kHz SCS. However, in lower bands (e.g., frequency division duplex (FDD) bands), guard bands 230 may still take up a considerable amount/proportion of resources, and there is a desire to reduce the amount of resources that are allocated to guard bands 230, while simultaneously preventing or reducing ACI within a network. For instance, by reducing a size of a guard band 230 by one resource block (RB) on each side of the guard band 230 in the frequency domain, the number RBs usable for communications may increase from 25 to 27 RBs, resulting in an 8% increase in resource efficiency.

As cellular functionalities and radio access technologies (RATs) evolve and network entities 105 and devices become more capable to support advanced features, there is an opportunity to further improve a utilization of guards bands 230 to achieve even higher spectral efficiency, such as in Sixth Generation (6G) networks. In such cases, network nodes (e.g., network entity 105-*a*) and other devices (e.g., UE 115-*a*) may be equipped with digital/analog processing schemes and filtering techniques to reduce emissions, and thereby reduce adjacent channel leakage ratio (ACLR) that the respective devices impose in other bands. Similarly, such advanced devices may be able to exploit schemes to reduce the ACI that experienced from (asynchronous) transmissions taking place in other channels 225.

Taken together, such advanced devices may be able to more efficiently perform communications within given sets of frequency resources, thereby enabling the devices to perform communications within resources that are closer to one another in the frequency domain, such as within guard bands 230. However, the support of such schemes may be limited to certain classes of devices based on device capabilities. In other words, some wireless devices may be able to perform communications within guard bands 230 without causing ACI on adjacent channels 225, while other devices may not.

For the purposes of the present disclosure, the term ACLR may refer to out-of-band emissions resulting from ACI. That is, ACLR is caused by a transmitting (Tx) device, whereas ACI is experienced by a receiving (Rx) device. In this regard, both the emission control on the Tx side and interference mitigation on the Rx side may be controlled and improved to reduce noise and interference between two devices. Moreover, wireless devices may have varying capabilities for controlling ACLR when performing transmissions on the Tx side, and for controlling ACI when receiving transmissions on the Rx side. For example, a UE 115 capable of controlling ACLR may be provided resources within the guard to transmit, and a UE 115 capable of ACI rejection may be assigned resources within a guard to receive.

Further, whether and to what extent such an ability to schedule communications within guard bands 230 may be effective could be dependent on other factors, such as characteristics of the respective bands/channels 225 (e.g., NS or non-NS bands, bands for military or satellite use, etc.), scheduling details, and the like. In other words, although it might not be possible to universally reduce the size/existence of guard bands 230 in all scenarios, there may be cases where networks may schedule communications within guard bands 230 and/or reduce the size of guard bands 230 to take advantage of additional RBs, thereby increasing throughput and resource utilization.

Accordingly, the wireless communications system 200 may support techniques that enable guard bands 230 to be dynamically used for communications. That is, the wireless communications system 200 may support techniques for dynamically handling guard band 230 reduction for current and future generations of cellular networks. In particular, aspects of the present disclosure are directed to rules and configurations that enable communications to be scheduled within guard bands 230 when specific parameters are used to perform the communications, and/or when certain conditions are satisfied.

For example, referring to the wireless communications system 200 illustrated in FIG. 2, the UE 115-*a* may transmit capability signaling 210 to the network entity 105-*a*. The capability signaling 210 may indicate information associated with a capability of the UE 115-*a* to perform communications within guard bands 230. In particular, the capability signaling 210 may indicate sets of parameters for communications performed by the UE 115-*a* that enable the UE 115-*a* to perform communications within guard bands 230 without detrimentally affecting adjacent channels 225. In other words, the capability signaling 210 may indicate that the UE 115-*a* is able to perform communications within guard bands 230 in accordance with various conditions or criteria.

Parameters that are indicated by the capability signaling 210 as being supported by the UE 115-*a* may include, but are not limited to, supported modulation schemes (e.g., modulation and coding schemes (MCSs)), supported modulation orders, power class information (e.g., Tx power information associated with the UE 115-*a*), waveforms supported by the UE 115-*a*, MPR values associated with the UE 115-*a*, ACI/ACLR thresholds that may be achieved by the UE 115-*a*, or any combination thereof. In this regard, the capability signaling 210 may indicate sets of parameters that are supported by the UE 115-*a*, where the sets of parameters may be used to determine whether the UE 115-*a* is able to satisfy conditions or criteria that are used to perform communications within guard bands 230.

In some aspects, the UE 115-*a* may receive control signaling 215 (e.g., RRC signaling, system information signaling) from the network entity 105-*a*. The control signaling 215 may indicate a communication frame structure 220 usable for communications between the UE 115-*a* and the network entity 105-*a*. For example, as shown in FIG. 2, the communication frame structure 220 may include a first channel 225-*a* (e.g., first band, or first carrier) and a second channel 225-*b* (e.g., second band, or second carrier) that are used to schedule communications between the respective devices. The communication frame structure 220 may further include a guard band 230 that separates the respective channels 225-*a*, 225-*b* in the frequency domain. In some cases, the size of the guard bands 230 may be defined by the network (e.g., defined by relevant standards), and may or may not be explicitly indicated to the UE 115-*a*. In some cases, the channels 225 and guard band 230 may span multiple slots 235 or transmission time intervals (TTIs) in the time domain.

In some cases, the control signaling 215 may indicate whether or not communications (e.g., messages 245) may be scheduled within the guard band 230. In other words, the control signaling 215 may indicate whether the network is able to dynamically adjust the use of the guard band 230 to support wireless communications.

In some aspects, the use or purpose of guard bands 230 may be changed in accordance with two different mechanisms: (1) dynamically, and (2) semi-statically. In the context of dynamic control of guard bands 230, the use of the guard bands 230 may be determined or adjusted based on actual resource allocations within the respective channels 225, such as the channels 225-*a*, 225-*b*, that are adjacent to the respective guard band 230. For example, in one or both neighboring channels 225, schedulers (e.g., network entity 105-*a*, another network entity 105) may decide to use up resources within the initial guard bands 230 for scheduled communications. This example of dynamic scheduling of the guard bands may be more suitable across channels 225 within the same frequency band (e.g., same set of frequency resources) or across frequency bands owned and operated by the same mobile network operator (MNO) which can be controlled by coordinated schedulers.

Comparatively, in the context of semi-static control of guard bands 230, if the conditions above are not met (e.g., if the channels 225 are in different frequency bands, and/or operate by different MNOs), the guard bands 230 may be shared across channels 225 (e.g., guard bands 230 may be used to extend usable resources of the channels 225) based on some semi-static partitioning rule. For example, the schedulers/networks (e.g., network entity 105-*a*) operating on adjacent channels 225 may negotiate or otherwise agree on rules or configurations that enable the respective schedulers/network entities 105 to use resources within the guard bands 230 during different time intervals.

In other words, the network entity 105-*a* and a second network entity 105 (not shown) may exchange signaling to negotiate (e.g., agree) that the first network entity 105-*a* is able to use the guard band 230 for communications (e.g., scheduled message 245-*a*) during the first slot 235-*a* or first TTI, that neither network entity 105 is able to use the guard band 230 during the second slot 235-*b*, and that the second network entity 105 is able to use the guard band 230 for communications (e.g., scheduled message 245-*b*) during the third slot 235-*c* or third TTI. For instance, for a 5 MHz frequency band, in a TDM fashion, scheduler/network #1 (e.g., network entity 105-*a*) may use all resources within the guard band 230 during the first slot 235-*a*, while the other network entity 105 does not extend its communications beyond its original 25 RBs of an adjacent channel 225. Continuing with the same example, at another time, such as during the third slot 235-*c*, the network entities 105 may switch such that the second network entity 105 is able to use all the resources within the guard band 230 during the third slot 235-*c*, and at another time, such as a subsequent slot 235, each network entity 105 may extend communications within an adjacent channel 225 into the guard band 230 by 1 RB, and so on.

In some cases, the exchange of information (e.g., negotiation) between schedulers/network entities 105 may be helpful in making scheduling decisions. For example, in cases where the network entity 105-*a* knows that an adjacent channel 225-*b* may have transmissions within the guard band 230 during the third slot 235-*c*, the network entity 105-*a* may schedule devices during the third slot 235-*c* that have better ACI rejection capability in neighboring RBs.

In some aspects, whether or not guard bands 230 may be used for communications (e.g., whether the size of the guard bands 230 may be reduced) may be dependent on multiple factors, such as whether the network entities 105 and UEs 115 which are assigned resources within the guard band 230 can still meet the ACLR requirements by containing respective emissions, and whether the network entities 105 and UEs 115 scheduled close to the reduced guard bands 230 to handle experienced ACI attributable to the reduced guard bands 230.

Accordingly, in accordance with some aspects of the present disclosure, the ability to schedule communications within guard bands 230 may be limited to certain time periods and/or frequency ranges. For example, the ability to schedule communications within guard bands 230 may be limited only to non-NS bands which have more relaxed ACLR requirements, and/or certain frequency ranges (e.g., FR1, FR2, FR3, etc.).

Moreover, in some cases, communications performed within guard bands 230 may be required to be performed in accordance with certain parameters that satisfy conditions or criteria, where the conditions/criteria are configured to reduce or eliminate the potential the communications performed within the guard band 230 cause interference on neighboring channels 225. In other words, communications may be scheduled within the guard band 230 may be based on ACLR/ACI/ACS requirements or thresholds, capabilities of the respective devices to perform the communications (e.g., capabilities of the network entity 105 and the UE 115-*a*), scheduling parameters, band of operation, and duplexing modes.

Stated differently, not all network nodes/UEs 115 may be capable of controlling ACLR/ACI when guard bands 230 are reduced. For example, the UE 115-*a* may be able to satisfy or meet emission thresholds (e.g., conditions/criteria) for perfuming communications within the guard band 230 for a subset of modulation orders, while another UE 115 (e.g., higher complexity or more sophisticated UE 115) may be able to satisfy such emission thresholds for modulation orders.

As such, wireless devices may be expected to utilize certain parameters, and comply with various conditions/criteria, in order to perform communications within the guard band 230. Parameters and/or conditions/criteria for performing communications within the guard band 230 may include, but are not limited to, specified modulation schemes (e.g., MCSs) and/or modulation orders, specified waveforms, duplexing modes, applicable or allowable ACLR/ACI thresholds, transmit powers, power classes, MPR values, and the like.

Similarly, in some cases, communications scheduled within the guard band 230 may be required to conform to some arrangement or configuration of RBs within the guard band 230. In other words, the arrangement/location of RBs scheduled within the guard band may be used as another parameter/condition for performing communications within the guard band 230. For example, in some cases, communications (e.g., scheduled messages 245) may be supported within the guard band 230 only for smaller allocations at the edge of the channel 225, where RBs within the guard band 230 may be appended to the allocation. In other words, in some cases, only a certain quantity of RBs at the edges of the guard band 230 in the frequency domain may be usable for scheduled messages 245.

For example, some cases, whether or not communications may be scheduled within the guard band 230 may be based on the duplexing modes of the bands where the channels 225 reside. For example, communications may be scheduled within guard bands 230 within FDD and/or TDD bands, but may not be scheduled within guard bands 230 supported in FDD/TDD bands but not supported in bands 230 allowing for FD operation. In this regard, the duplexing mode of the adjacent channels 225 may be a condition/criteria for performing communications within the guard band 230.

In some cases, the capability signaling 210 may enable the network entity 105-*a* to determine whether or not the UE 115-*a* is able to meet the conditions/criteria for performing communications within the guard band 230. In other words, the network entity 105-*a* may use the capability signaling 210 to determine whether or not the UE 115-*a* may be scheduled to perform communications (e.g., transmit or receive) within the guard band 230. In other words, whether or not the UE 115-*a* is able to be scheduled with communications within the guard band 230 may be dependent on ACLR/ACI change (directly or indirectly) with the UE 115-*a* power class, allocation bandwidth, location of RBs within the guard band 230, and modulation order(s) supported by the UE 115-*a*. For example, in some cases, the network entity 105-*a* may determine that only PC3 UEs 115 may be able to satisfy the conditions/criteria for performing communications within the guard band 230.

In other cases, an allowed MPR (e.g., MPR values) may also be dependent on UE 115 capability of supporting communications within the guard band 230. In other words, MPR values may be defined as a parameter or condition/criteria that must be used or satisfied in order to perform communications within the guard band 230. For example, a category or class of UEs 115 may be allowed to have MPR value of 3 dB when assigned resources for communications within the guard band 230, where UEs 115 within the category/class may be allowed to have a smaller MPR value when performing communications outside of the guard band 230.

Further, different categories or classes of UEs 115 may be defined, where the respective categories/classes of UEs 115 may be configured with different parameters and/or conditions/criteria for performing communications with the guard band 230. For example, UEs 115 within a first category/class may be expected to perform communications within the guard band 230 using a first set of parameters that satisfy a first set of conditions, where UEs 115 within a second category/class may be expected to perform communications within the guard band 230 using a second set of parameters that satisfy a second set of conditions. In such cases, categories/classes of UEs 115 may be predefined, and the capability signaling 210 may indicate which category/class the UE 115 belongs to.

By way of another example, the ability to perform communications within the guard band 230 may be waveform dependent. In other words, The support of this feature could be waveform dependent. In other words, certain waveforms may be defined as a parameter or condition/criteria that must be used or satisfied in order to perform communications within the guard band 230. The rationale for using allowed waveforms as a parameter/condition for performing communications within the guard band 230 is that it is easier to achieve a contained frequency (while meeting target peak-to-average power ratio (PAPR) and other requirements) for some waveforms as compared to other waveforms. Further, in some cases, waveform parameter setting may be dependent on whether the UE 115-*a* is allocated resources within the guard band 230 or not. As an example, the Tx filter used for generating single-carrier frequency domain equalization (SC-FDE) waveform may be smoother (translating into a wider bandwidth expansion) as compared to other cases or waveforms.

In cases where the network entity 105-*a* determines that the UE 115-*a* is able to meet the conditions for performing communications within the guard band 230 (e.g., based on the capability signaling 210), the network entity 105-*a* may transmit a control message 240 (e.g., DCI) to the UE 115-*a*, where the control message 240 schedules a message 245-*a* that at least partially overlaps with the guard band 230. For example, the control message 240 illustrated in FIG. 2 may indicate a set of resources for a scheduled message 245-*a* to be performed between the UE 115-*a* and the network entity 105-*a*, where the resources at least partially overlap with the guard band 230 in the frequency domain.

In some cases, the network may utilize different implementations for scheduling messages 245 within the guard band 230. For example, in some cases, different DCI formats may be used to indicate whether the number of usable RBs is extended or not. In other words, the network may use a first DCI format when scheduling messages 245 that do not overlap with the guard band 230, and may use a second DCI format when scheduling messages 245 that do overlap with the guard band 230.

Additionally, or alternatively, the network entity 105-*a* may utilize specific bit fields within the control message 240 to indicate whether scheduled messages 245 are to be performed within the guard band 230, and which RBs of the guard band 230 are to be used. For example, in some cases, the control message 240 may use one or more frequency domain resource allocation (FDRA) bit fields to indicate whether (and which) RBs within the guard band 230 are being scheduled for the message 245-*a*. In such cases, each FDRA bit field may correspond (e.g., be used to schedule)

one or more RBs within the guard band 230. In this regard, the quantity of FDRA bit fields within the control message 240 may be dependent on the number of available RBs and the resource allocation modes. Moreover, in cases where the quantity of usable RBs changes, the quantity of FDRA bit fields may be changed or updated to reflect the new quantities of usable RBs.

For example, the quantity of FDRA bit fields within the control message 240 (e.g., DCI message) may be designed or configured to cover/schedule the maximum number of RBs that may be used within a channel 225 and/or guard band 230 across time. For instance, the quantity of FDRA bit fields within the control message 240 may be configured to schedule 25 or 27 RBs within a 5 MHz channel 225, depending on the quantity of RBs per channel 225 in each slot 235/TTI. In such cases, the network entity 105-*a* may be configured to ensure that the number of RBs assigned to the UE 115-*a* is less than or equal to the number of usable RBs within the respective channel 225 and/or guard band 230. Further, in some aspects, the UE 115-*a* may be configured with one or more patterns that indicates changes of the maximum number of usable RBs across time (e.g., pattern that indicates the maximum number of usable RBs with the channel 225 and/or guard band 230 will change from X to Y at time Z). In this regard, when FDRA bit fields point to an RB that is outside of the usable RBs, the UE 115-*a* may be configured to assume those RBs are not available.

In additional or alternative implementations, additional bit fields or portions of the control message 240 may be used to indicate how the UE 115-*a* is to interpret the FDRA bit field values. In other words, other bit fields/portions of the control message 240 (e.g., dedicated bit fields, scrambled CRC portion) may be used to indicate different mappings between the FDRA bit fields and the resources scheduled by the control message 240. In other words, the size/quantity of the FDRA bit fields may remain the same, where other bit fields/indications within the control message 240 may be used to indicate to the UE 115-*a* whether the number of usable and/or scheduled RBs is X or Y. As such, given that the FDRA size is fixed, the allocation resolution may be changed.

Subsequently, after receiving the control message 240 scheduling the message 245-*a*, the UE 115-*a* and the network entity 105-*a* may communicate the scheduled message with one another 245-*a*, where at least a portion of the message 245-*a* is communicated within the guard band 230. For example, in cases where the message 245-*a* includes an uplink message 245-*a*, the UE 115-*a* may transmit the uplink message 245-*a* to the network entity 105-*a* via the communication link 205. Comparatively, in cases where the message 245-*a* includes a downlink message 245-*a*, the network entity 105-*a* may transmit the downlink message 245-*a* to the UE 115-*a* via the communication link 205.

Techniques described herein may enable communications to be dynamically scheduled and performed within guard bands 230 that separate communication channels 225 in the frequency domain. As such, techniques described herein may increase the amount of resources that are usable for communications, thereby enabling increased throughput and improved resource utilization within the wireless communications system 200. Additionally, techniques described herein may enable communications to be scheduled and performed within guard bands 230 only when certain parameters are used, and/or when certain conditions or criteria are met. By ensuring that communications performed within guard bands 230 are performed in accordance with defined (e.g., allowed) sets of parameters or conditions, techniques described herein may improve resource utilization while simultaneously ensuring that communications performed within guard bands 230 do not detrimentally affect communications within adjacent channels 225.

Figure 3:
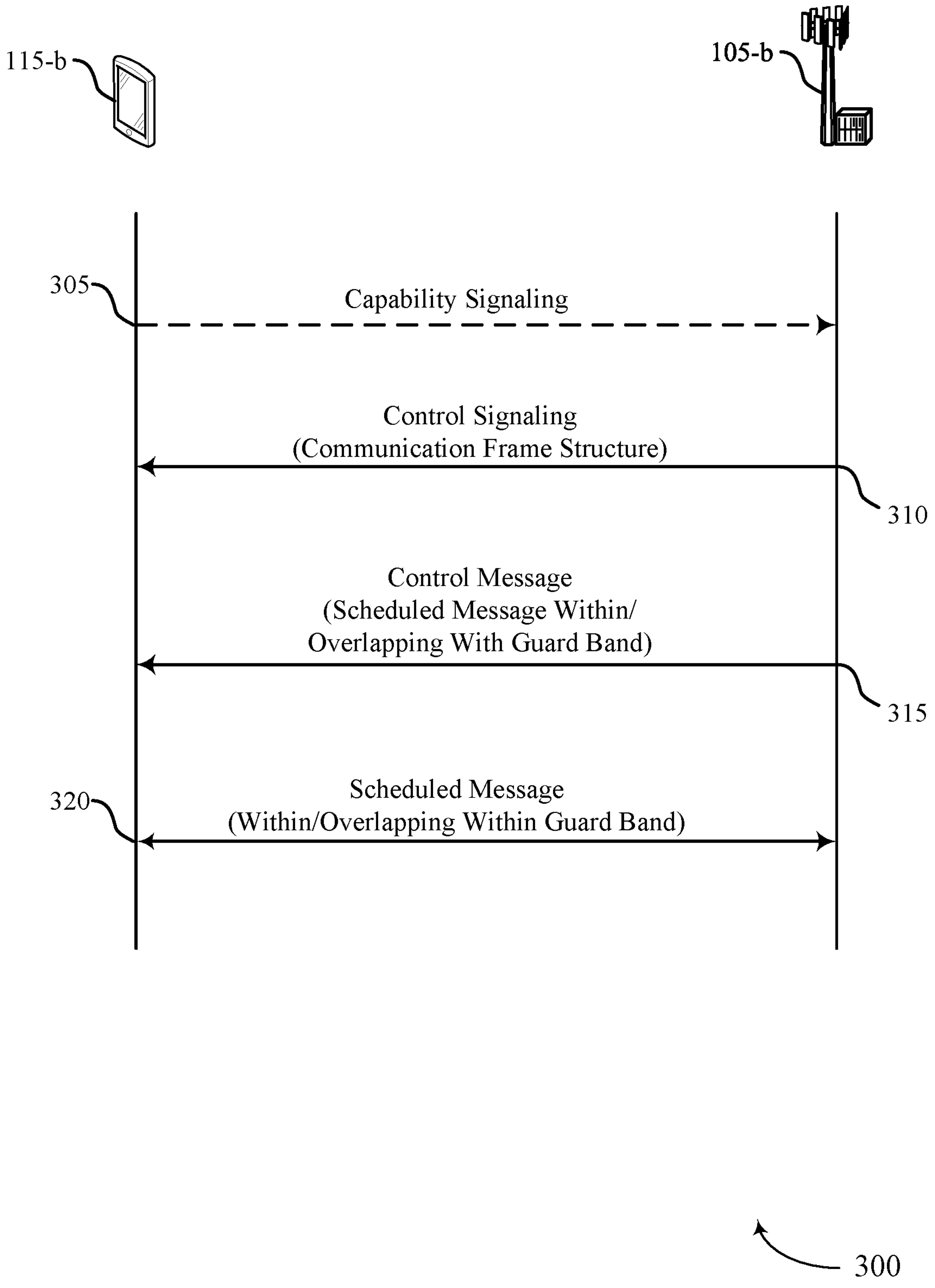
FIG. 3 shows an example of a process flow that supports techniques for communications within dynamic guard bands in accordance with one or more aspects of the present disclosure.

FIG. 3 shows an example of a process flow 300 that supports techniques for communications within dynamic guard bands in accordance with one or more aspects of the present disclosure. Aspects of the process flow 300 may implement, or be implemented by, aspects of the wireless communications system 100, the wireless communications system 200, or both. For example, the process flow 300 illustrates signaling and configurations that enable the network to dynamically schedule communications within guard bands in such a manner that prevents such communications from detrimentally affecting adjacent channels, as described previously herein.

The process flow 300 includes a UE 115-*b* and a network entity 105-*b*, which may be examples of UEs 115, network entities 105, and other wireless devices as described herein. For example, the UE 115-*b* and the network entity 105-*b* illustrated in FIG. 7 may include examples of the UE 115-*a* and the network entity 105-*a*, respectively, as illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-*b* may transmit capability signaling to the network entity 105-*b*. In some aspects, the capability signaling may indicate a capability of the UE 115-*a* to perform communications within a guard band of a communication frame structure in accordance with the one or more conditions. In particular, the capability signaling may indicate various parameters that are usable by UE 115-*b* for performing communications within a guard band. In this regard, the network entity 105-*b* may utilize the capability signaling to determine whether or not the UE 115-*b* is able to be scheduled to perform communications within a guard band using parameters that satisfy certain conditions/criteria.

Parameters or conditions for performing communicants within the guard band that may be indicated by the capability signaling may include, but are not limited to, modulation schemes/orders (e.g., MCSs) supported by the UE 115-*b*, waveforms supported by the UE 115-*a*, ACI/ACLR thresholds supported by the UE 115-*a*, MPR values supported by the UE 115-*b*, and the like.

At 310, the UE 115-*b* may receive control signaling (e.g., RRC, system information) from the network entity 105-*b*, where the control signaling indicates a communication frame structure for communications between the UE 115-*b* and the network entity 105-*b*. For example, the control signaling at 310 may indicate the communication frame structure 220 illustrated in FIG. 2, where the communication frame structure 220 includes a guard band 230 between a first channel 225-*a* and a second channel 225-*b* in the frequency domain. In some cases, the UE 115-*b* may receive (and the network entity 105-*b* may transmit) the control signaling at 310 based on transmitting/receiving the capability signaling at 305.

At 315, the UE 115-*b* may receive a control message (e.g., DCI, MAC-CE) from the network entity 105-*b*, where the control message indicates a set of resources for a message between the UE 115-*b* and the network entity 105-*b*, wherein at least a subset of the set of resources are included within the guard band of the communication frame structure. For example, as shown in FIG. 2, the UE 115-*b* may receive a control message 240 that schedules a message 245-*a* that at least partially overlaps with the guard band 230 of the communication frame structure 220.

In some cases, the UE 115-*b* may receive (and the network entity 105-*b* may transmit) the control message at 315 based on transmitting/receiving the capability signaling at 305, receiving/transmitting the control signaling at 310, or both. Moreover, in some cases, the control signaling at 310 and the control message at 315 may be the same. For example, the UE 115-*a* may receive a single control message that both indicates a communication frame structure and schedules a message within a guard band of the communication frame structure.

In some cases, the control signaling at 310, the control message at 315, or both, may indicate a set of slots/TTIs, a set of frequency resources (e.g., frequency bands or frequency ranges), or both, that are enabled for communications within one or more guard bands. For example, as shown in FIG. 2, the control signaling may indicate that the first slot 235-*a* and the third slot 235-*c* are enabled for scheduling communications within the guard band 230, where communications may not be scheduled within the second slot 235-*b* (e.g., the second slot 235-*b* is disabled for scheduling communications within the guard band 230). In such cases, the message scheduled by the control message at 315 may be scheduled within sets of time/frequency resources that are enabled for communications within the guard band.

In some aspects, the control signaling at 310, the control message at 315, or both, may indicate a set of parameters and/or a set of conditions for performing the scheduled message within the guard band. In other words, the network entity 105-*b* may explicitly indicate which parameters the UE 115-*b* is to use when performing the scheduled message, and/or which conditions/criteria the UE 115-*b* must satisfy when performing the scheduled message. In additional or alternative implementations, the UE 115-*a* may implicitly know or determine the set of parameters and/or the set of conditions for performing the scheduled message based on determining that the message is at least partially scheduled within the guard band.

As noted previously herein, parameters/conditions for performing communications within the guard band may include, but are not limited to, ACI/ACLR thresholds, modulation schemes/orders, waveforms, duplexing modes, MPR values, arrangements/configurations of resources (e.g., RBs) scheduled within the guard band, and the like.

In some aspects, the control message at 315 may be associated with a control message format (e.g., DCI format) that is used for scheduling messages within the guard band. Additionally, or alternatively, the control message may utilize one or more FDRA bit field values to indicate which RBs within the guard band are being scheduled for the message between the UE 115-*b* and the network entity 105-*b*. In some cases, the control message may include additional bit fields or portions (e.g., scrambled CRC portion) that indicates how the UE 115-*b* is to interpret the FDRA field values indicating scheduled RBs within the guard band.

At 320, the UE 115-*b* and the network entity 105-*b* may perform the scheduled message with one another. For example, in cases where the scheduled message includes an uplink message, the UE 115-*b* may transmit the uplink message to the network entity 105-*b* at 320. Comparatively, in cases where the scheduled message includes a downlink message, the network entity 105-*b* may transmit the downlink message to the UE 115-*b* at 320. In this regard, the devices may perform the scheduled communication with one another at 320 based on transmitting/receiving the capability signaling at 305, receiving/transmitting the control signaling at 310, receiving/transmitting the control message at 315, or any combination thereof.

Techniques described herein may enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system. Additionally, techniques described herein may enable communications to be scheduled and performed within guard bands only when certain parameters are used, and/or when certain conditions or criteria are met. By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

Figure 4:
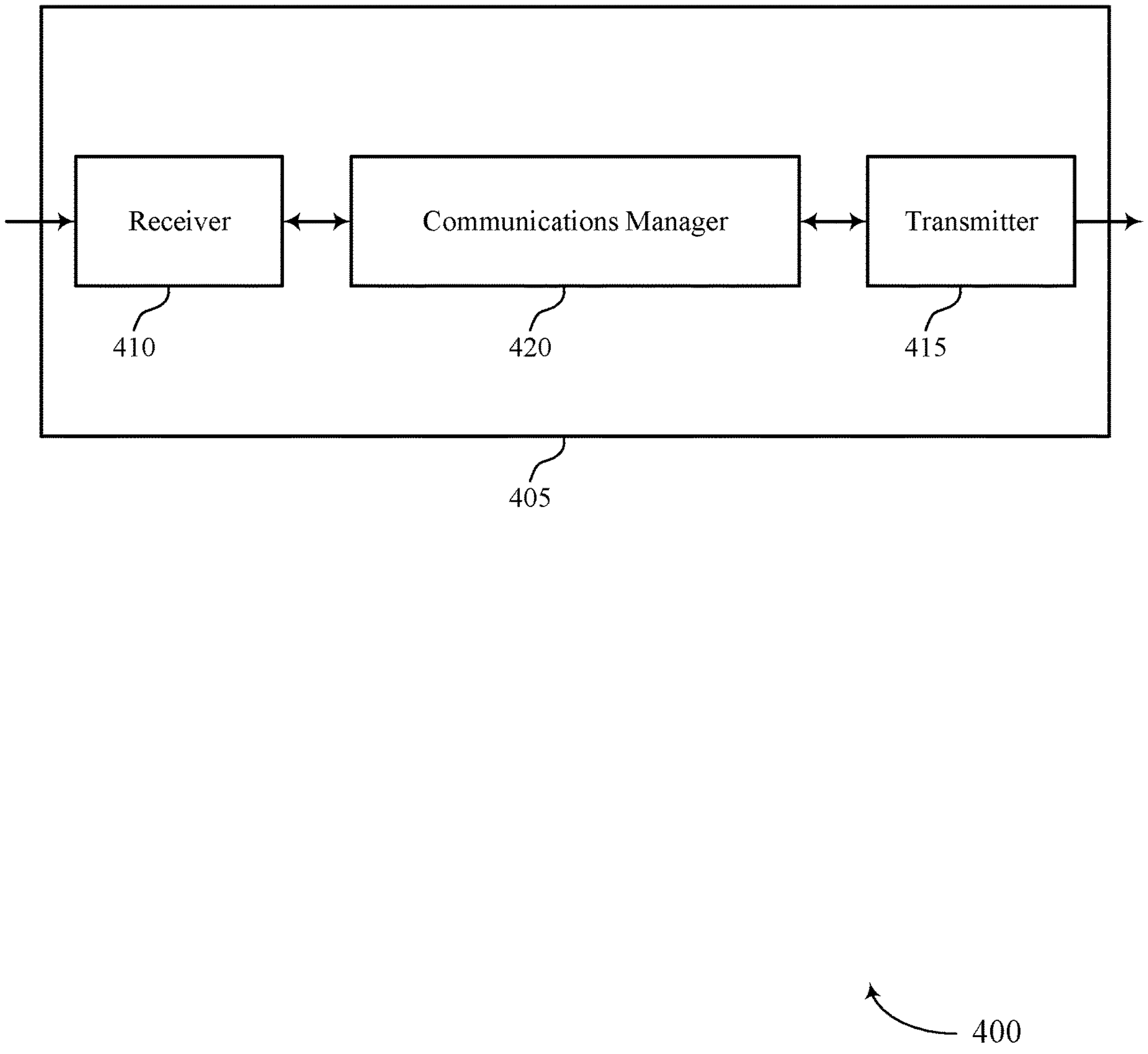
FIGS. 4 and 5 show block diagrams of devices that support techniques for communications within dynamic guard bands in accordance with one or more aspects of the present disclosure.

FIG. 4 shows a block diagram 400 of a device 405 that supports techniques for communications within dynamic guard bands in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for communications within dynamic guard bands). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for communications within dynamic guard bands). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for communications within dynamic guard bands as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

For example, the communications manager 420 is capable of, configured to, or operable to support a means for receiving, from a network entity, control signaling indicating a communication frame structure for communications between the UE and the network entity, where the communication frame structure includes a guard band between a first channel and a second channel in a frequency domain. The communications manager 420 is capable of, configured to, or operable to support a means for receiving a control message indicating a set of resources for a message between the UE and the network entity, where at least a subset of resources of the set of resources are included within the guard band. The communications manager 420 is capable of, configured to, or operable to support a means for communicating the message with the network entity within the set of resources and in accordance with a set of parameters that satisfy one or more conditions for performing communications within the guard band.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for that enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system 100. Additionally, techniques described herein may enable communications to be scheduled and performed within guard bands only when certain parameters are used, and/or when certain conditions or criteria are met. By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

Figure 5:
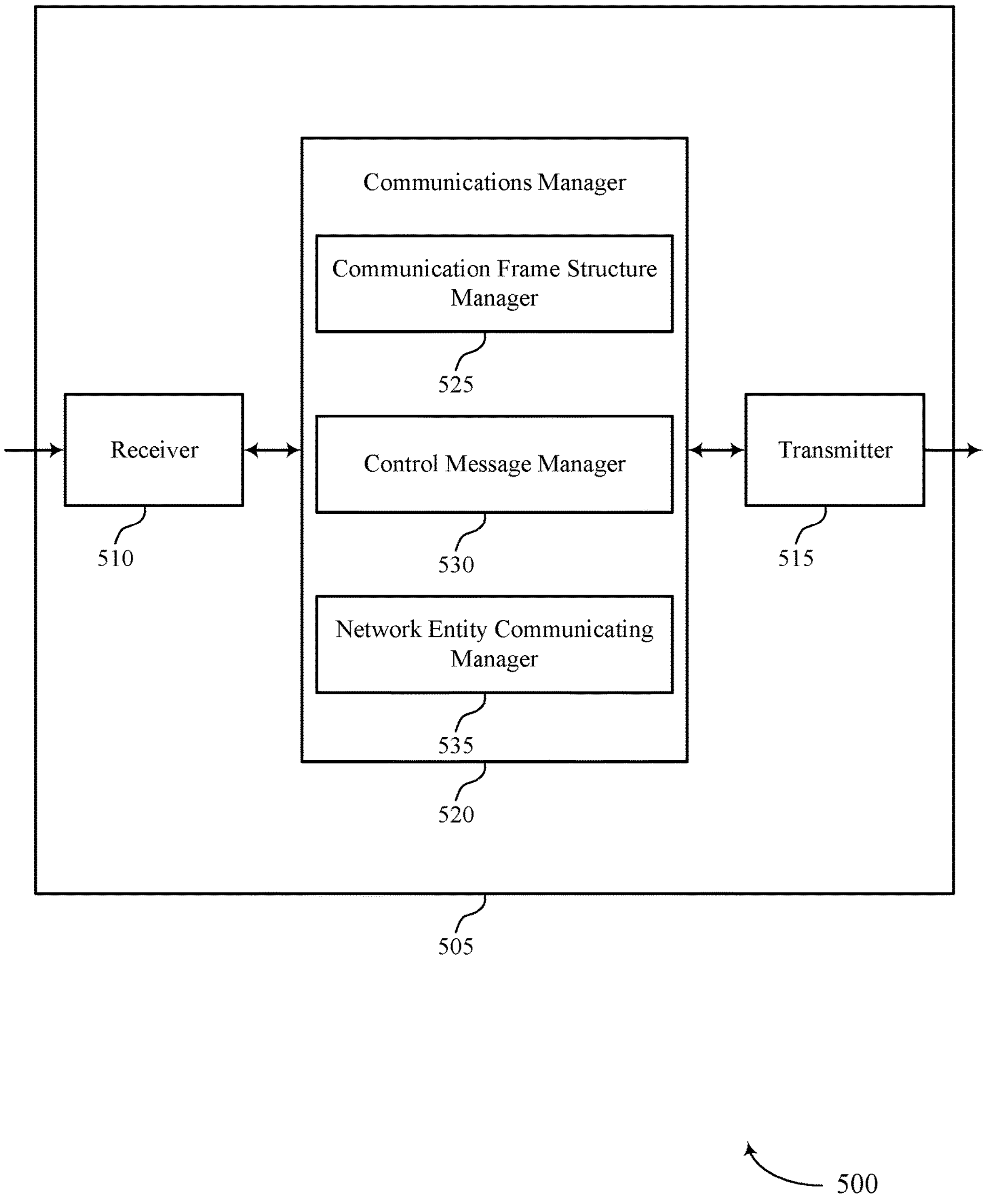

FIG. 5 shows a block diagram 500 of a device 505 that supports techniques for communications within dynamic guard bands in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for communications within dynamic guard bands). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for communications within dynamic guard bands). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for communications within dynamic guard bands as described herein. For example, the communications manager 520 may include a communication frame structure manager 525, a control message manager 530, a network entity communicating manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communication frame structure manager 525 is capable of, configured to, or operable to support a means for receiving, from a network entity, control signaling indicating a communication frame structure for communications between the UE and the network entity, where the communication frame structure includes a guard band between a first channel and a second channel in a frequency domain. The control message manager 530 is capable of, configured to, or operable to support a means for receiving a control message indicating a set of resources for a message between the UE and the network entity, where at least a subset of resources of the set of resources are included within the guard band. The network entity communicating manager 535 is capable of, configured to, or operable to support a means for communicating the message with the network entity within the set of resources and in accordance with a set of parameters that satisfy one or more conditions for performing communications within the guard band.

Figure 6:
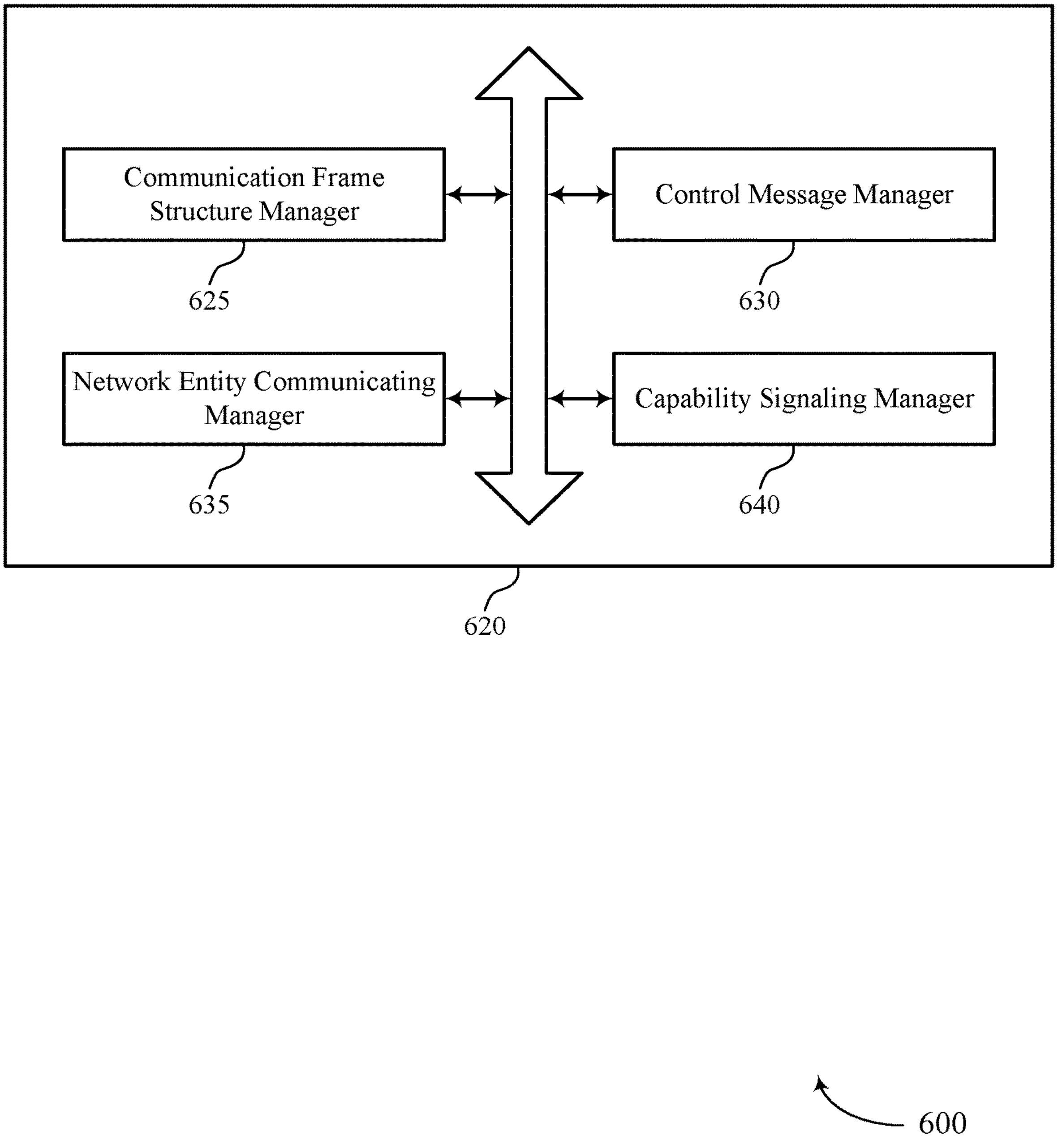
FIG. 6 shows a block diagram of a communications manager that supports techniques for communications within dynamic guard bands in accordance with one or more aspects of the present disclosure.

FIG. 6 shows a block diagram 600 of a communications manager 620 that supports techniques for communications within dynamic guard bands in accordance with one or more aspects of the present disclosure. The communications manager 620 may be an example of aspects of a communications manager 420, a communications manager 520, or both, as described herein. The communications manager 620, or various components thereof, may be an example of means for performing various aspects of techniques for communications within dynamic guard bands as described herein. For example, the communications manager 620 may include a communication frame structure manager 625, a control message manager 630, a network entity communicating manager 635, a capability signaling manager 640, or any combination thereof. Each of these components may communicate, directly or indirectly, with one another (e.g., via one or more buses).

The communication frame structure manager 625 is capable of, configured to, or operable to support a means for receiving, from a network entity, control signaling indicating a communication frame structure for communications between the UE and the network entity, where the communication frame structure includes a guard band between a first channel and a second channel in a frequency domain. The control message manager 630 is capable of, configured to, or operable to support a means for receiving a control message indicating a set of resources for a message between the UE and the network entity, where at least a subset of resources of the set of resources are included within the guard band. The network entity communicating manager 635 is capable of, configured to, or operable to support a means for communicating the message with the network entity within the set of resources and in accordance with a set of parameters that satisfy one or more conditions for performing communications within the guard band.

In some examples, the capability signaling manager 640 is capable of, configured to, or operable to support a means for transmitting, to the network entity, capability signaling indicating a capability of the UE to perform communications within the guard band in accordance with the one or more conditions, where receiving the control message, communicating the message, or both, is based on the capability signaling.

In some examples, the capability signaling manager 640 is capable of, configured to, or operable to support a means for transmitting, via the capability signaling, an indication of a modulation scheme, a modulation order, or both, that is supported by the UE, where the message is communicated in accordance with the modulation scheme, the modulation order, or both, and where the set of parameters include the modulation scheme, the modulation order, or both.

In some examples, the control message manager 630 is capable of, configured to, or operable to support a means for receiving, via the control signaling, the control message, or both, a set of TTIs, a set of frequency resources, or both, that are enabled for communications within one or more guard bands, where the message is communicated within a TTI of the set of TTIs, within the set of frequency resources, or both.

In some examples, the control message manager 630 is capable of, configured to, or operable to support a means for receiving, via the control signaling, the control message, or both, an indication of the set of parameters, an indication of the one or more conditions, or both, where communicating the message is based on receiving the indication of the set of parameters, the indication of the one or more conditions, or both.

In some examples, the control message manager 630 is capable of, configured to, or operable to support a means for receiving, via the control message, one or more FDRA bit field values that indicate the at least the subset of resources that are included within the guard band. In some examples, a quantity of FDRA bit fields included within the control message is based on a quantity of RBs of the guard band that are available for scheduled communications. In some examples, each FDRA bit field value of the one or more FDRA bit field values is associated with one or more RBs of the guard band.

In some examples, the control message manager 630 is capable of, configured to, or operable to support a means for receiving, via the control message, one or more additional bit field values, a scrambled CRC portion, or both, where a mapping between the one or more FDRA bit field values and the at least the subset of resources that are included within the guard band is interpreted in accordance with the one or more additional bit field values, the scrambled CRC portion, or both.

In some examples, the control message includes a DCI message that is associated with a DCI format for scheduling communications within the guard band. In some examples, the one or more conditions for performing communications within the guard band include an ACI threshold, an adjacent channel leakage ratio threshold, or both. In some examples, the set of parameters includes an ACI level that satisfies the ACI threshold, an adjacent channel leakage ratio that satisfies the adjacent channel leakage ratio threshold, or both.

In some examples, the one or more conditions for performing communications within the guard band include one or more duplexing modes, one or more modulation orders, one or more modulation schemes, or any combination thereof, that are enabled for communications within the guard band. In some examples, the set of parameters include a duplexing mode included within the one or more duplexing modes, a modulation order included within the one or more modulation orders, a modulation scheme included within the one or more modulation schemes, or any combination thereof.

In some examples, the one or more conditions for performing communications within the guard band include an arrangement of resources within the guard band. In some examples, the set of parameters include the arrangement of resources within the guard band. In some examples, the one or more conditions for performing communications within the guard band include an MPR value for messages transmitted by the UE. In some examples, the set of parameters include the MPR value.

In some examples, the one or more conditions for performing communications within the guard band include one or more waveforms that are enabled for communications within the guard band. In some examples, the set of parameters include a waveform that is included within the one or more waveforms.

Figure 7:
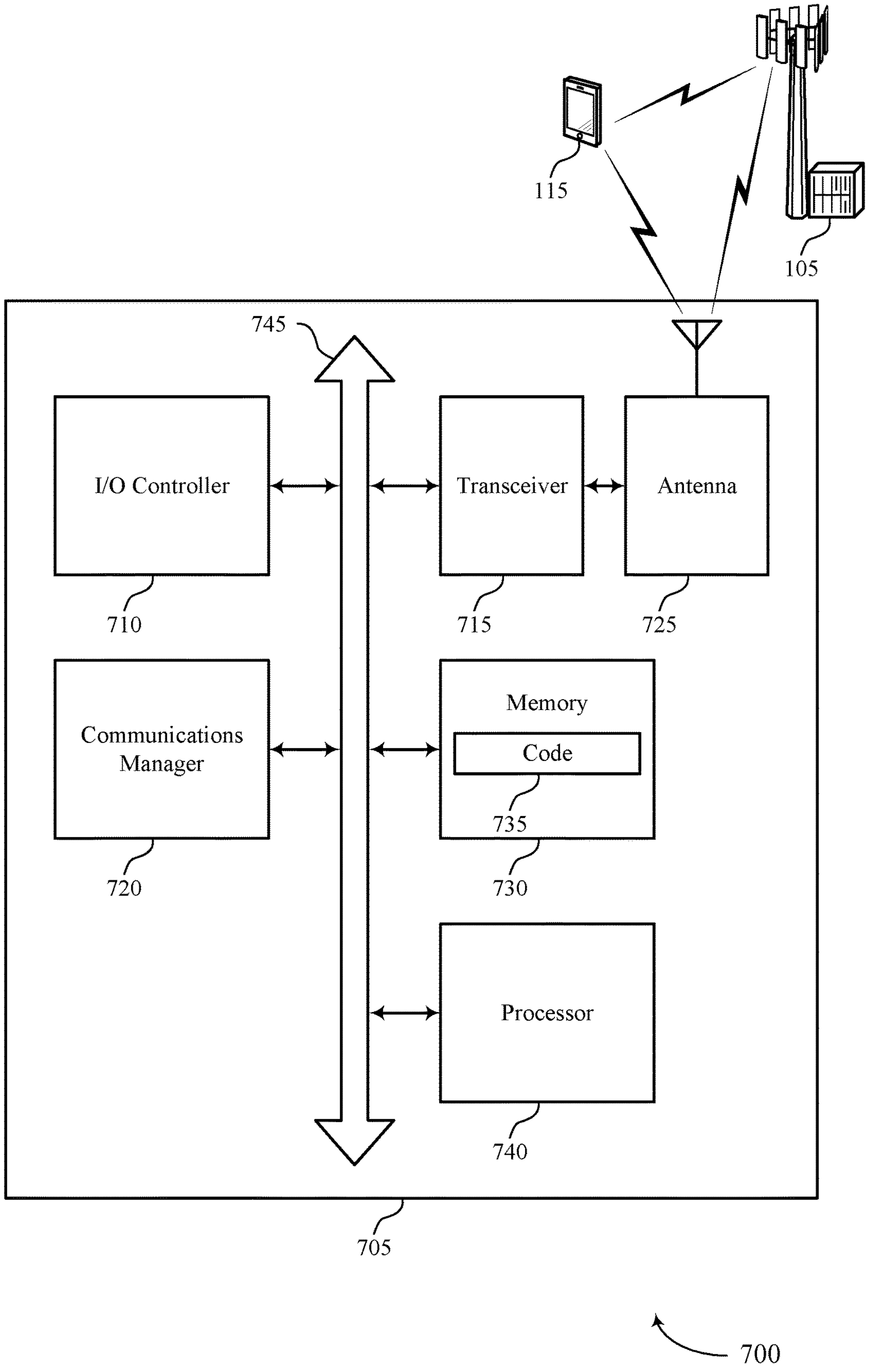
FIG. 7 shows a diagram of a system including a device that supports techniques for communications within dynamic guard bands in accordance with one or more aspects of the present disclosure.

FIG. 7 shows a diagram of a system 700 including a device 705 that supports techniques for communications within dynamic guard bands in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for communications within dynamic guard bands). For example, the device 705 or a component of the device 705 may include a processor 740 and memory 730 coupled with or to the processor 740, the processor 740 and memory 730 configured to perform various functions described herein.

For example, the communications manager 720 is capable of, configured to, or operable to support a means for receiving, from a network entity, control signaling indicating a communication frame structure for communications between the UE and the network entity, where the communication frame structure includes a guard band between a first channel and a second channel in a frequency domain. The communications manager 720 is capable of, configured to, or operable to support a means for receiving a control message indicating a set of resources for a message between the UE and the network entity, where at least a subset of resources of the set of resources are included within the guard band. The communications manager 720 is capable of, configured to, or operable to support a means for communicating the message with the network entity within the set of resources and in accordance with a set of parameters that satisfy one or more conditions for performing communications within the guard band.

By including or configuring the communications manager 720 in accordance with examples as described herein, the device 705 may support techniques that enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system 100. Additionally, techniques described herein may enable communications to be scheduled and performed within guard bands only when certain parameters are used, and/or when certain conditions or criteria are met. By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for communications within dynamic guard bands as described herein, or the processor 740 and the memory 730 may be otherwise configured to perform or support such operations.

Figure 8:
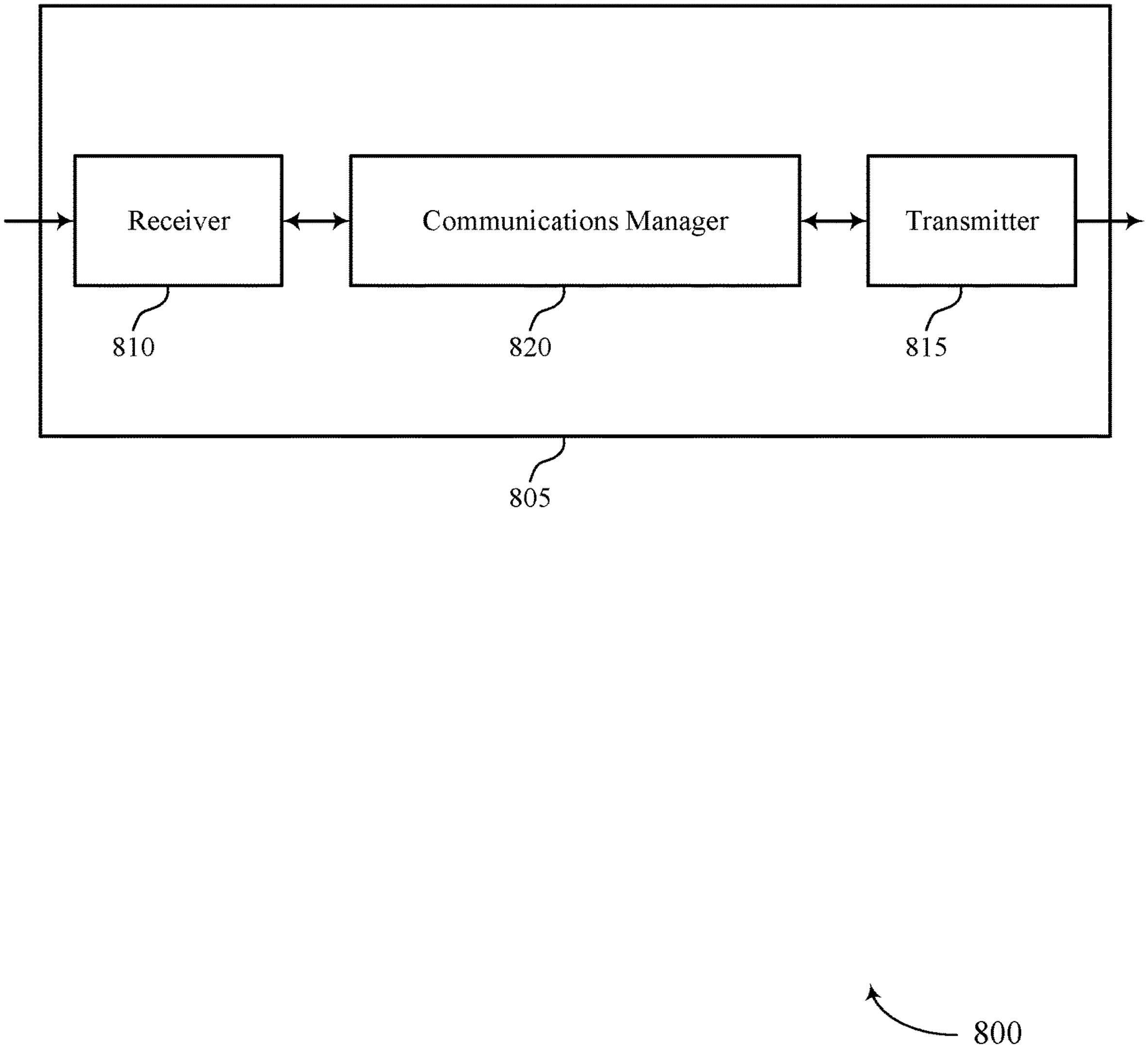
FIGS. 8 and 9 show block diagrams of devices that support techniques for communications within dynamic guard bands in accordance with one or more aspects of the present disclosure.

FIG. 8 shows a block diagram 800 of a device 805 that supports techniques for communications within dynamic guard bands in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of techniques for communications within dynamic guard bands as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

For example, the communications manager 820 is capable of, configured to, or operable to support a means for transmitting, to a UE, control signaling indicating a communication frame structure for communications between the UE and the network entity, where the communication frame structure includes a guard band between a first channel and a second channel in a frequency domain. The communications manager 820 is capable of, configured to, or operable to support a means for transmitting a control message indicating a set of resources for a message between the UE and the network entity, where at least a subset of resources of the set of resources are included within the guard band. The communications manager 820 is capable of, configured to, or operable to support a means for communicating the message with the UE within the set of resources and in accordance with a set of parameters that satisfy one or more conditions for performing communications within the guard band.

By including or configuring the communications manager 820 in accordance with examples as described herein, the device 805 (e.g., a processor controlling or otherwise coupled with the receiver 810, the transmitter 815, the communications manager 820, or a combination thereof) may support techniques that enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system 100. Additionally, techniques described herein may enable communications to be scheduled and performed within guard bands only when certain parameters are used, and/or when certain conditions or criteria are met. By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

Figure 9:
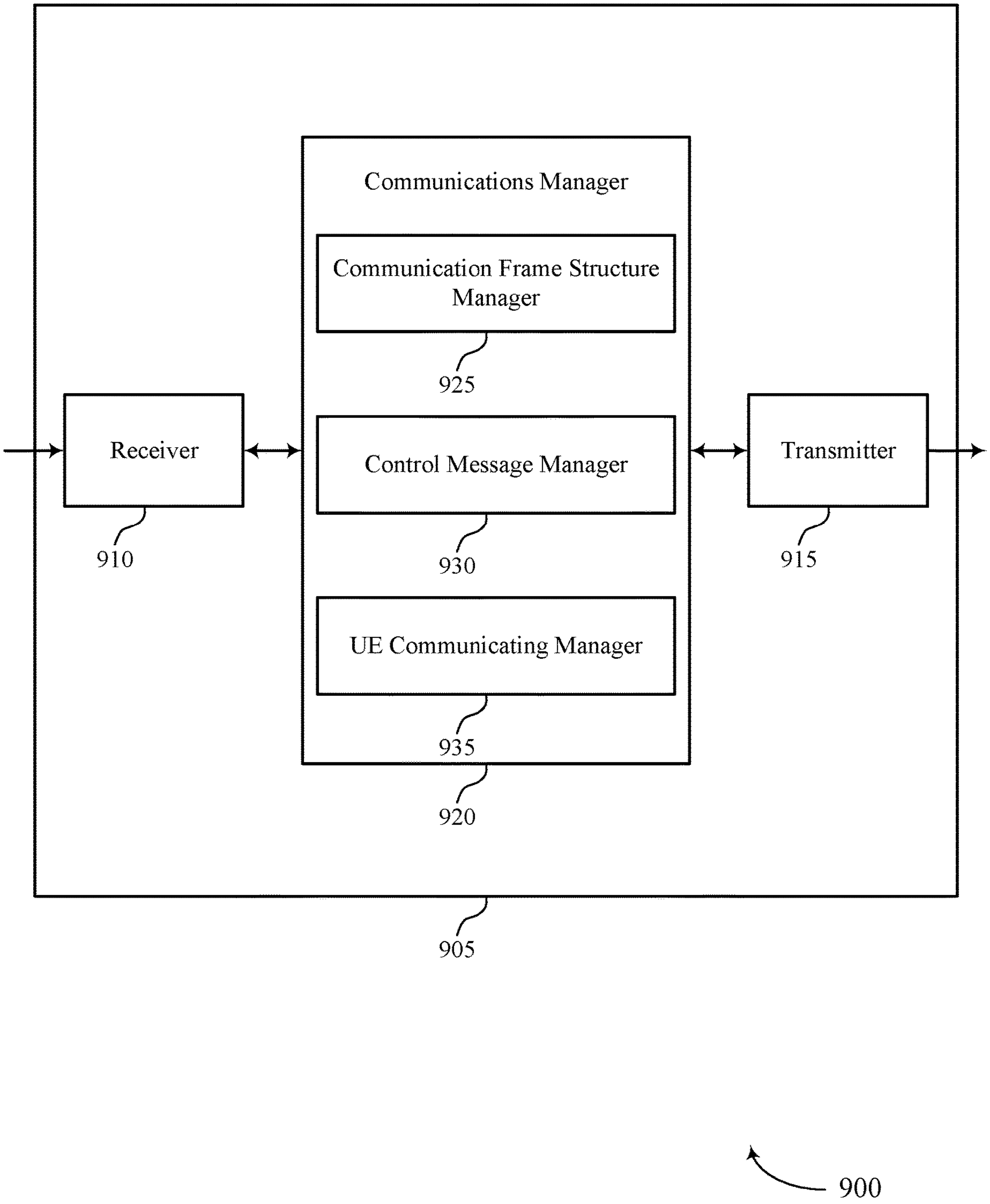

FIG. 9 shows a block diagram 900 of a device 905 that supports techniques for communications within dynamic guard bands in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of techniques for communications within dynamic guard bands as described herein. For example, the communications manager 920 may include a communication frame structure manager 925, a control message manager 930, a UE communicating manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communication frame structure manager 925 is capable of, configured to, or operable to support a means for transmitting, to a UE, control signaling indicating a communication frame structure for communications between the UE and the network entity, where the communication frame structure includes a guard band between a first channel and a second channel in a frequency domain. The control message manager 930 is capable of, configured to, or operable to support a means for transmitting a control message indicating a set of resources for a message between the UE and the network entity, where at least a subset of resources of the set of resources are included within the guard band. The UE communicating manager 935 is capable of, configured to, or operable to support a means for communicating the message with the UE within the set of resources and in accordance with a set of parameters that satisfy one or more conditions for performing communications within the guard band.

Figure 10:
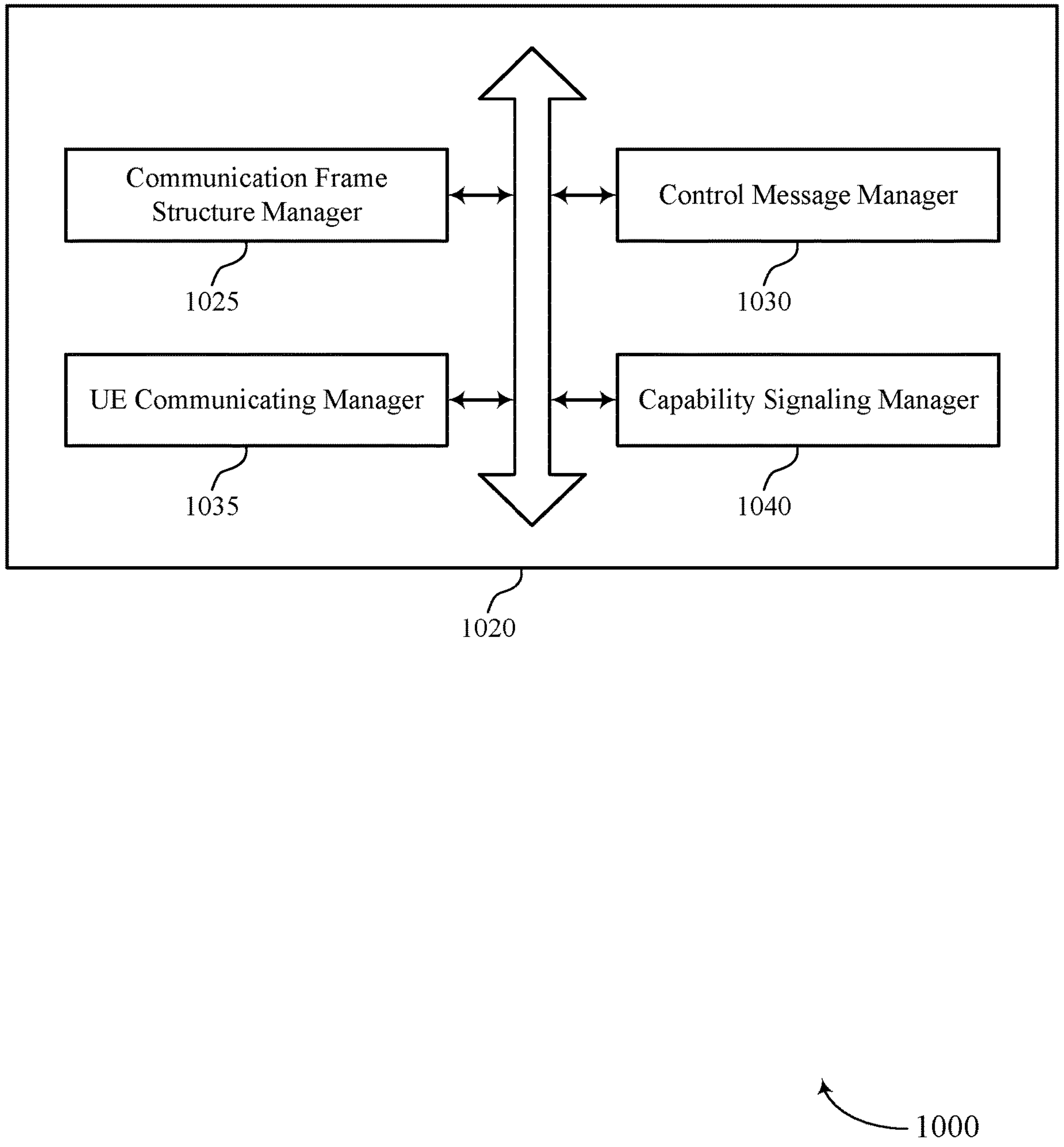
FIG. 10 shows a block diagram of a communications manager that supports techniques for communications within dynamic guard bands in accordance with one or more aspects of the present disclosure.

FIG. 10 shows a block diagram 1000 of a communications manager 1020 that supports techniques for communications within dynamic guard bands in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of techniques for communications within dynamic guard bands as described herein. For example, the communications manager 1020 may include a communication frame structure manager 1025, a control message manager 1030, a UE communicating manager 1035, a capability signaling manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communication frame structure manager 1025 is capable of, configured to, or operable to support a means for transmitting, to a UE, control signaling indicating a communication frame structure for communications between the UE and the network entity, where the communication frame structure includes a guard band between a first channel and a second channel in a frequency domain. The control message manager 1030 is capable of, configured to, or operable to support a means for transmitting a control message indicating a set of resources for a message between the UE and the network entity, where at least a subset of resources of the set of resources are included within the guard band. The UE communicating manager 1035 is capable of, configured to, or operable to support a means for communicating the message with the UE within the set of resources and in accordance with a set of parameters that satisfy one or more conditions for performing communications within the guard band.

In some examples, the capability signaling manager 1040 is capable of, configured to, or operable to support a means for receiving, from the UE, capability signaling indicating a capability of the UE to perform communications within the guard band in accordance with the one or more conditions, where transmitting the control message, communicating the message, or both, is based on the capability signaling.

In some examples, the capability signaling manager 1040 is capable of, configured to, or operable to support a means for receiving, via the capability signaling, an indication of a modulation scheme, a modulation order, or both, that is supported by the UE, where the message is communicated in accordance with the modulation scheme, the modulation order, or both, and where the set of parameters include the modulation scheme, the modulation order, or both.

In some examples, the control message manager 1030 is capable of, configured to, or operable to support a means for transmitting, via the control signaling, the control message, or both, a set of TTIs, a set of frequency resources, or both, that are enabled for communications within one or more guard bands, where the message is communicated within a TTI of the set of TTIs, within the set of frequency resources, or both.

In some examples, the control message manager 1030 is capable of, configured to, or operable to support a means for transmitting, via the control signaling, the control message, or both, an indication of the set of parameters, an indication of the one or more conditions, or both, where communicating the message is based on transmitting the indication of the set of parameters, the indication of the one or more conditions, or both.

In some examples, the control message manager 1030 is capable of, configured to, or operable to support a means for transmitting, via the control message, one or more FDRA bit field values that indicate the at least the subset of resources that are included within the guard band. In some examples, a quantity of FDRA bit fields included within the control message is based on a quantity of RBs of the guard band that are available for scheduled communications. In some examples, each FDRA bit field value of the one or more FDRA bit field values is associated with one or more RBs of the guard band.

In some examples, the control message manager 1030 is capable of, configured to, or operable to support a means for transmitting, via the control message, one or more additional bit field values, a scrambled CRC portion, or both, where a mapping between the one or more FDRA bit field values and the at least the subset of resources that are included within the guard band is interpreted in accordance with the one or more additional bit field values, the scrambled CRC portion, or both.

In some examples, the control message includes a DCI message that is associated with a DCI format for scheduling communications within the guard band. In some examples, the one or more conditions for performing communications within the guard band include an ACI threshold, an adjacent channel leakage ratio threshold, or both. In some examples, the set of parameters includes an ACI level that satisfies the ACI threshold, an adjacent channel leakage ratio that satisfies the adjacent channel leakage ratio threshold, or both.

In some examples, the one or more conditions for performing communications within the guard band include one or more duplexing modes, one or more modulation orders, one or more modulation schemes, or any combination thereof, that are enabled for communications within the guard band. In some examples, the set of parameters include a duplexing mode included within the one or more duplexing modes, a modulation order included within the one or more modulation orders, a modulation scheme included within the one or more modulation schemes, or any combination thereof.

In some examples, the one or more conditions for performing communications within the guard band include an arrangement of resources within the guard band. In some examples, the set of parameters include the arrangement of resources within the guard band. In some examples, the one or more conditions for performing communications within the guard band include a maximum power reduction value for messages transmitted by the UE. In some examples, the set of parameters include the maximum power reduction value.

In some examples, the one or more conditions for performing communications within the guard band include one or more waveforms that are enabled for communications within the guard band. In some examples, the set of parameters include a waveform that is included within the one or more waveforms.

Figure 11:
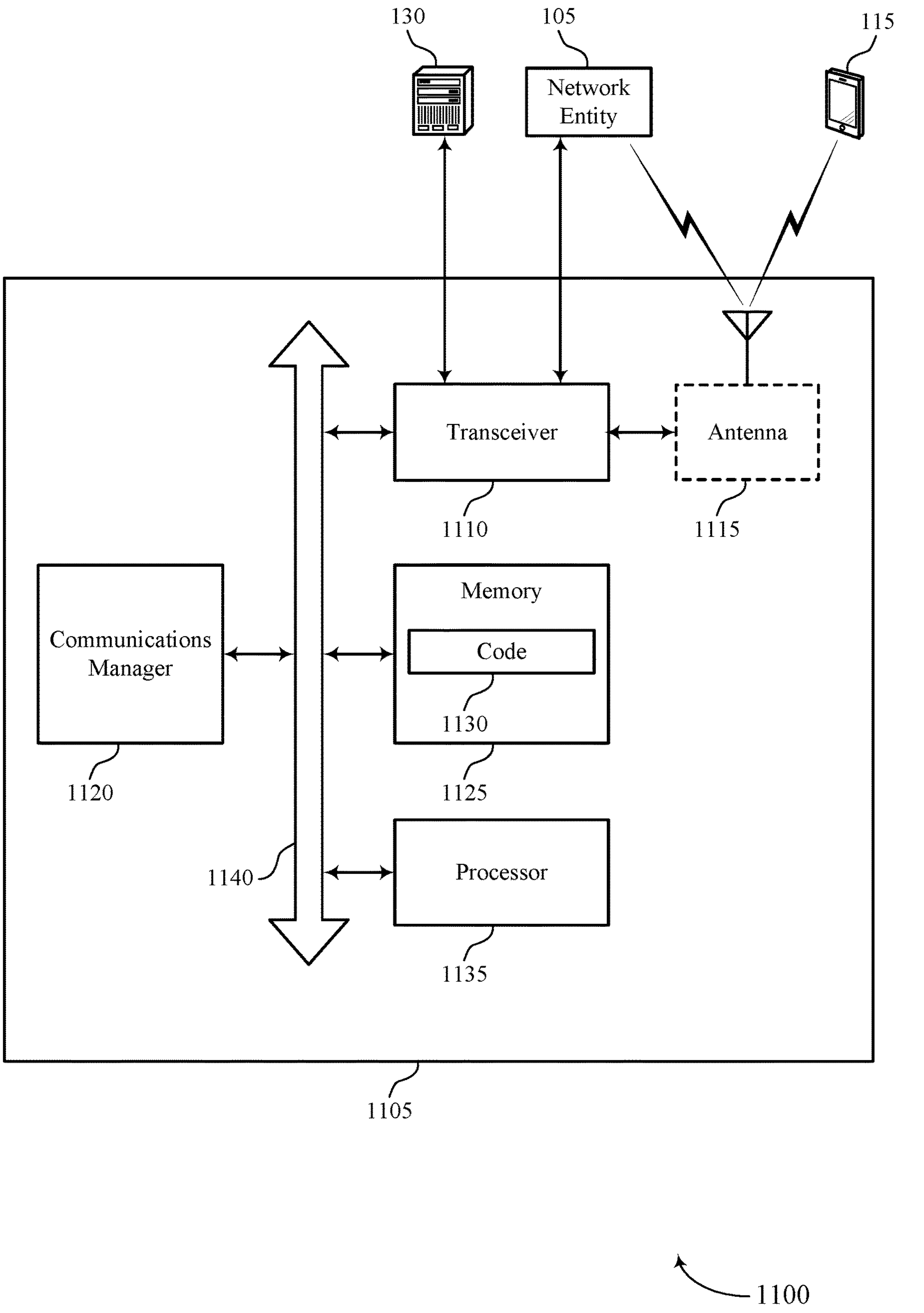
FIG. 11 shows a diagram of a system including a device that supports techniques for communications within dynamic guard bands in accordance with one or more aspects of the present disclosure.

FIG. 11 shows a diagram of a system 1100 including a device 1105 that supports techniques for communications within dynamic guard bands in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting techniques for communications within dynamic guard bands). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

For example, the communications manager 1120 is capable of, configured to, or operable to support a means for transmitting, to a UE, control signaling indicating a communication frame structure for communications between the UE and the network entity, where the communication frame structure includes a guard band between a first channel and a second channel in a frequency domain. The communications manager 1120 is capable of, configured to, or operable to support a means for transmitting a control message indicating a set of resources for a message between the UE and the network entity, where at least a subset of resources of the set of resources are included within the guard band. The communications manager 1120 is capable of, configured to, or operable to support a means for communicating the message with the UE within the set of resources and in accordance with a set of parameters that satisfy one or more conditions for performing communications within the guard band.

By including or configuring the communications manager 1120 in accordance with examples as described herein, the device 1105 may support techniques that enable communications to be dynamically scheduled and performed within guard bands that separate communication channels in the frequency domain. As such, techniques described herein may increase the amount of resources that are usable for communications, thereby enabling increased throughput and improved resource utilization within the wireless communications system 100. Additionally, techniques described herein may enable communications to be scheduled and performed within guard bands only when certain parameters are used, and/or when certain conditions or criteria are met.

By ensuring that communications performed within guard bands are performed in accordance with defined (e.g., allowed) sets of parameters or conditions, techniques described herein may improve resource utilization while simultaneously ensuring that communications performed within guard bands do not detrimentally affect communications within adjacent channels.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of techniques for communications within dynamic guard bands as described herein, or the processor 1135 and the memory 1125 may be otherwise configured to perform or support such operations.

Figure 12:
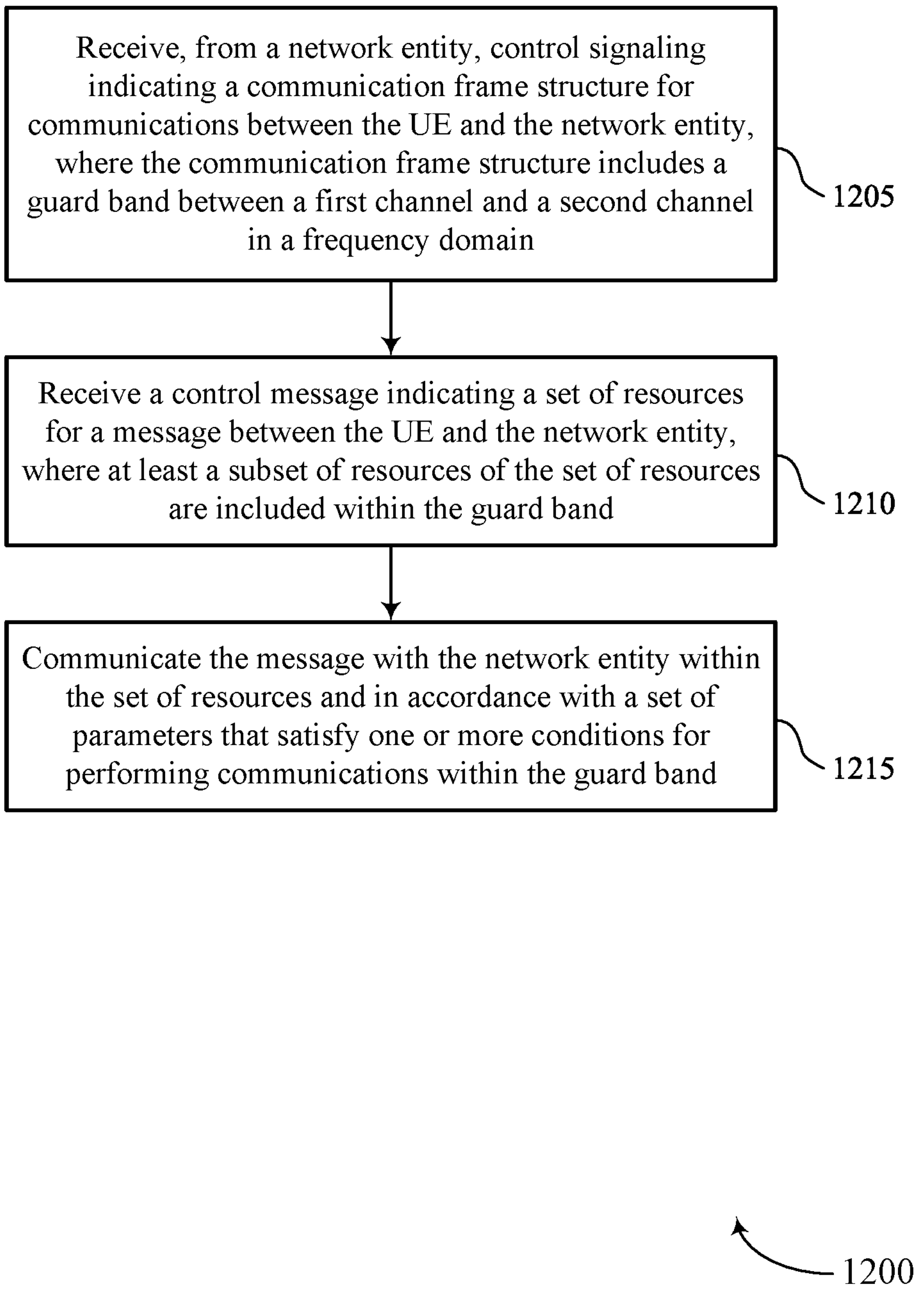
FIGS. 12 through 14 show flowcharts illustrating methods that support techniques for communications within dynamic guard bands in accordance with one or more aspects of the present disclosure.

FIG. 12 shows a flowchart illustrating a method 1200 that supports techniques for communications within dynamic guard bands in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the wireless UE to perform the described functions. Additionally, or alternatively, the wireless UE may perform aspects of the described functions using special-purpose hardware.

At 1205, the method may include receiving, from a network entity, control signaling indicating a communication frame structure for communications between the UE and the network entity, where the communication frame structure includes a guard band between a first channel and a second channel in a frequency domain. The operations of 1205 may be performed in accordance with examples as disclosed herein. In some examples, aspects of the operations of 1205 may be performed by a communication frame structure manager 625 as described with reference to FIG. 6.

At 1210, the method may include receiving a control message indicating a set of resources for a message between the UE and the network entity, where at least a subset of resources of the set of resources are included within the guard band. The operations of 1210 may be performed in accordance with examples as disclosed herein. In some examples, aspects of the operations of 1210 may be performed by a control message manager 630 as described with reference to FIG. 6.

At 1215, the method may include communicating the message with the network entity within the set of resources and in accordance with a set of parameters that satisfy one or more conditions for performing communications within the guard band. The operations of 1215 may be performed in accordance with examples as disclosed herein. In some examples, aspects of the operations of 1215 may be performed by a network entity communicating manager 635 as described with reference to FIG. 6.

Figure 13:
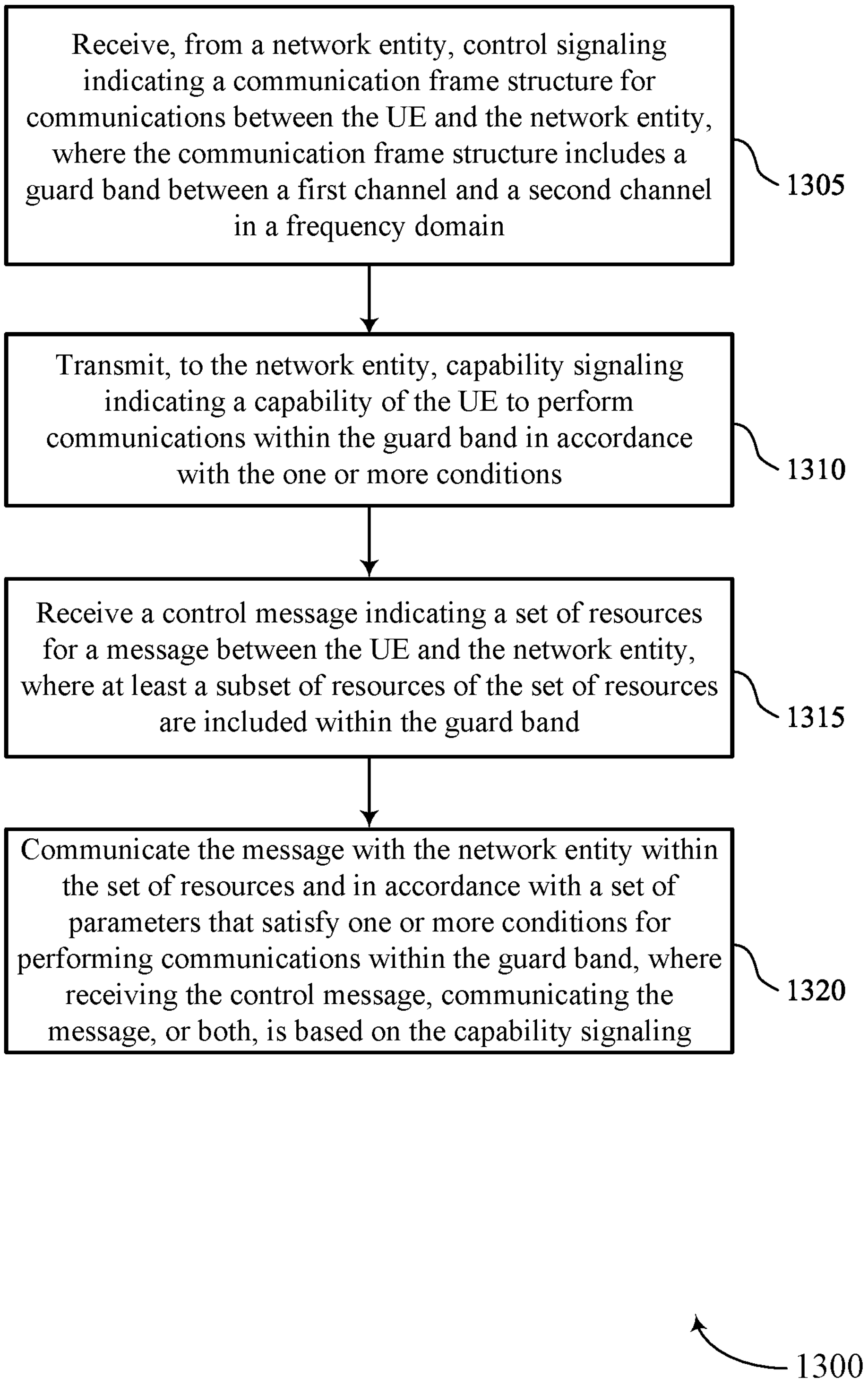

FIG. 13 shows a flowchart illustrating a method 1300 that supports techniques for communications within dynamic guard bands in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the wireless UE to perform the described functions. Additionally, or alternatively, the wireless UE may perform aspects of the described functions using special-purpose hardware.

At 1305, the method may include receiving, from a network entity, control signaling indicating a communication frame structure for communications between the UE and the network entity, where the communication frame structure includes a guard band between a first channel and a second channel in a frequency domain. The operations of 1305 may be performed in accordance with examples as disclosed herein. In some examples, aspects of the operations of 1305 may be performed by a communication frame structure manager 625 as described with reference to FIG. 6.

At 1310, the method may include transmitting, to the network entity, capability signaling indicating a capability of the UE to perform communications within the guard band in accordance with the one or more conditions. The operations of 1310 may be performed in accordance with examples as disclosed herein. In some examples, aspects of the operations of 1310 may be performed by a capability signaling manager 640 as described with reference to FIG. 6.

At 1315, the method may include receiving a control message indicating a set of resources for a message between the UE and the network entity, where at least a subset of resources of the set of resources are included within the guard band. The operations of 1315 may be performed in accordance with examples as disclosed herein. In some examples, aspects of the operations of 1315 may be performed by a control message manager 630 as described with reference to FIG. 6.

At 1320, the method may include communicating the message with the network entity within the set of resources and in accordance with a set of parameters that satisfy one or more conditions for performing communications within the guard band, where receiving the control message, communicating the message, or both, is based on the capability signaling. The operations of 1320 may be performed in accordance with examples as disclosed herein. In some examples, aspects of the operations of 1320 may be performed by a network entity communicating manager 635 as described with reference to FIG. 6.

Figure 14:
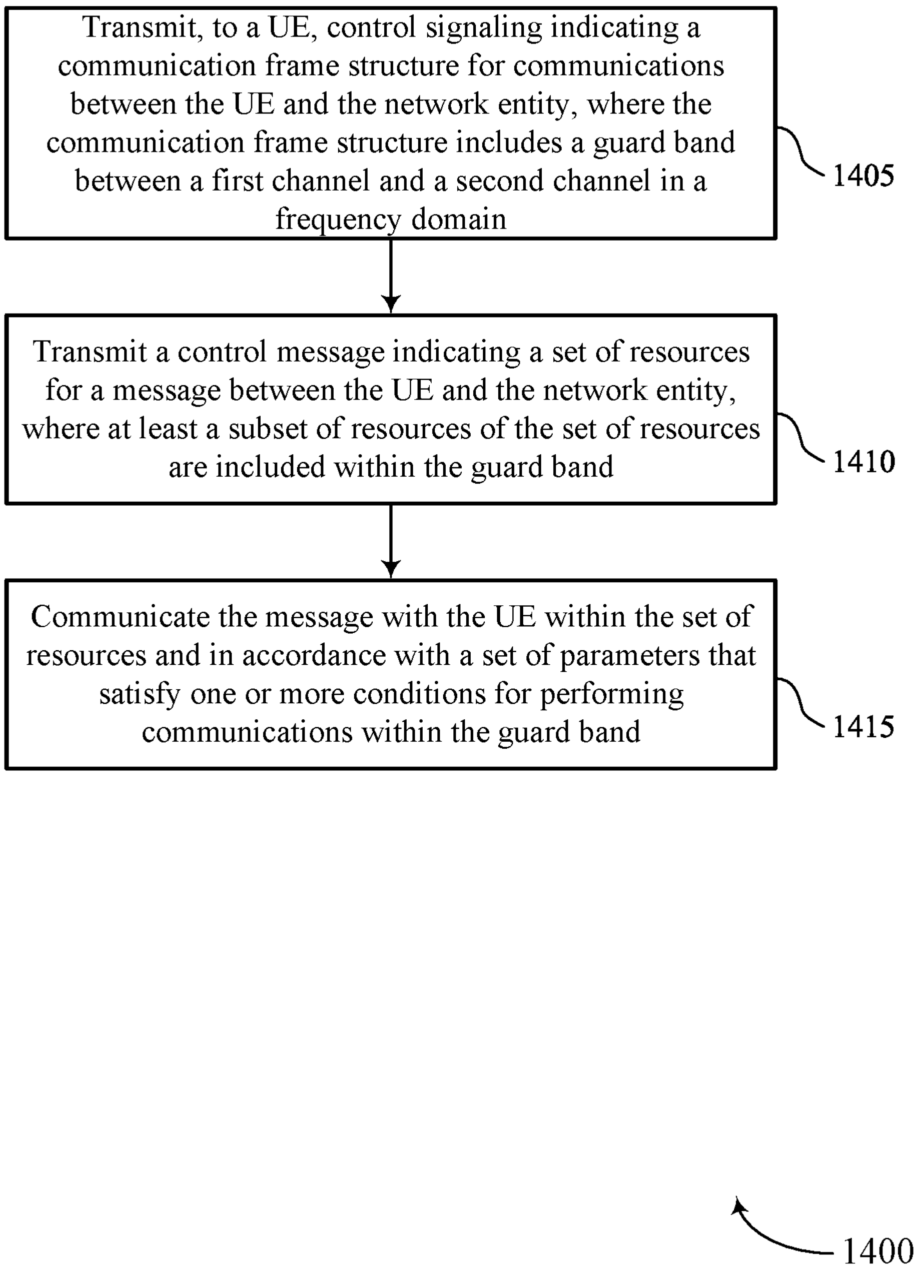

FIG. 14 shows a flowchart illustrating a method 1400 that supports techniques for communications within dynamic guard bands in accordance with aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the wireless network entity to perform the described functions. Additionally, or alternatively, the wireless network entity may perform aspects of the described functions using special-purpose hardware.

At 1405, the method may include transmitting, to a UE, control signaling indicating a communication frame structure for communications between the UE and the network entity, where the communication frame structure includes a guard band between a first channel and a second channel in a frequency domain. The operations of 1405 may be performed in accordance with examples as disclosed herein. In some examples, aspects of the operations of 1405 may be performed by a communication frame structure manager 1025 as described with reference to FIG. 10.

At 1410, the method may include transmitting a control message indicating a set of resources for a message between the UE and the network entity, where at least a subset of resources of the set of resources are included within the guard band. The operations of 1410 may be performed in accordance with examples as disclosed herein. In some examples, aspects of the operations of 1410 may be performed by a control message manager 1030 as described with reference to FIG. 10.

At 1415, the method may include communicating the message with the UE within the set of resources and in accordance with a set of parameters that satisfy one or more conditions for performing communications within the guard band. The operations of 1415 may be performed in accordance with examples as disclosed herein. In some examples, aspects of the operations of 1415 may be performed by a UE communicating manager 1035 as described with reference to FIG. 10.

The following provides an overview of aspects of the present disclosure:

Aspect 1: A method for wireless communication at a UE, comprising: receiving, from a network entity, control signaling indicating a communication frame structure for communications between the UE and the network entity, wherein the communication frame structure comprises a guard band between a first channel and a second channel in a frequency domain; receiving a control message indicating a set of resources for a message between the UE and the network entity, wherein at least a subset of resources of the set of resources are included within the guard band; and communicating the message with the network entity within the set of resources and in accordance with a set of parameters that satisfy one or more conditions for performing communications within the guard band.

Aspect 2: The method of aspect 1, further comprising: transmitting, to the network entity, capability signaling indicating a capability of the UE to perform communications within the guard band in accordance with the one or more conditions, wherein receiving the control message, communicating the message, or both, is based at least in part on the capability signaling.

Aspect 3: The method of aspect 2, further comprising: transmitting, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

Aspect 4: The method of any of aspects 1 through 3, further comprising: receiving, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

Aspect 5: The method of any of aspects 1 through 4, further comprising: receiving, via the control signaling, the control message, or both, an indication of the set of parameters, an indication of the one or more conditions, or both, wherein communicating the message is based at least in part on receiving the indication of the set of parameters, the indication of the one or more conditions, or both.

Aspect 6: The method of any of aspects 1 through 5, further comprising: receiving, via the control message, one or more FDRA bit field values that indicate the at least the subset of resources that are included within the guard band.

Aspect 7: The method of aspect 6, wherein a quantity of FDRA bit fields included within the control message is based at least in part on a quantity of RBs of the guard band that are available for scheduled communications.

Aspect 8: The method of any of aspects 6 through 7, wherein each FDRA bit field value of the one or more FDRA bit field values is associated with one or more RBs of the guard band.

Aspect 9: The method of any of aspects 6 through 8, further comprising: receiving, via the control message, one or more additional bit field values, a scrambled CRC portion, or both, wherein a mapping between the one or more FDRA bit field values and the at least the subset of resources that are included within the guard band is interpreted in accordance with the one or more additional bit field values, the scrambled CRC portion, or both.

Aspect 10: The method of any of aspects 1 through 9, wherein the control message comprises a DCI message that is associated with a DCI format for scheduling communications within the guard band.

Aspect 11: The method of any of aspects 1 through 10, wherein the one or more conditions for performing communications within the guard band comprise an ACI threshold, an ACLR threshold, or both, and the set of parameters comprises an ACI level that satisfies the ACI threshold, an ACLR that satisfies the ACLR threshold, or both.

Aspect 12: The method of any of aspects 1 through 11, wherein the one or more conditions for performing communications within the guard band comprise one or more duplexing modes, one or more modulation orders, one or more modulation schemes, or any combination thereof, that are enabled for communications within the guard band, and the set of parameters comprise a duplexing mode included within the one or more duplexing modes, a modulation order included within the one or more modulation orders, a modulation scheme included within the one or more modulation schemes, or any combination thereof.

Aspect 13: The method of any of aspects 1 through 12, wherein the one or more conditions for performing communications within the guard band comprise an arrangement of resources within the guard band, the set of parameters comprise the arrangement of resources within the guard band.

Aspect 14: The method of any of aspects 1 through 13, wherein the one or more conditions for performing communications within the guard band comprise an MPR value for messages transmitted by the UE, the set of parameters comprise the MPR value.

Aspect 15: The method of any of aspects 1 through 14, wherein the one or more conditions for performing communications within the guard band comprise one or more waveforms that are enabled for communications within the guard band, the set of parameters comprise a waveform that is included within the one or more waveforms.

Aspect 16: A method for wireless communication at a network entity, comprising: transmitting, to a UE, control signaling indicating a communication frame structure for communications between the UE and the network entity, wherein the communication frame structure comprises a guard band between a first channel and a second channel in a frequency domain; transmitting a control message indicating a set of resources for a message between the UE and the network entity, wherein at least a subset of resources of the set of resources are included within the guard band; and communicating the message with the UE within the set of resources and in accordance with a set of parameters that satisfy one or more conditions for performing communications within the guard band.

Aspect 17: The method of aspect 16, further comprising: receiving, from the UE, capability signaling indicating a capability of the UE to perform communications within the guard band in accordance with the one or more conditions, wherein transmitting the control message, communicating the message, or both, is based at least in part on the capability signaling.

Aspect 18: The method of aspect 17, further comprising: receiving, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

Aspect 19: The method of any of aspects 16 through 18, further comprising: transmitting, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

Aspect 20: The method of any of aspects 16 through 19, further comprising: transmitting, via the control signaling, the control message, or both, an indication of the set of parameters, an indication of the one or more conditions, or both, wherein communicating the message is based at least in part on transmitting the indication of the set of parameters, the indication of the one or more conditions, or both.

Aspect 21: The method of any of aspects 16 through 20, further comprising: transmitting, via the control message, one or more FDRA bit field values that indicate the at least the subset of resources that are included within the guard band.

Aspect 22: The method of aspect 21, wherein a quantity of FDRA bit fields included within the control message is based at least in part on a quantity of RBs of the guard band that are available for scheduled communications.

Aspect 23: The method of any of aspects 21 through 22, wherein each FDRA bit field value of the one or more FDRA bit field values is associated with one or more RBs of the guard band.

Aspect 24: The method of any of aspects 21 through 23, further comprising: transmitting, via the control message, one or more additional bit field values, a scrambled CRC portion, or both, wherein a mapping between the one or more FDRA bit field values and the at least the subset of resources that are included within the guard band is interpreted in accordance with the one or more additional bit field values, the scrambled CRC portion, or both.

Aspect 25: The method of any of aspects 16 through 24, wherein the control message comprises a DCI message that is associated with a DCI format for scheduling communications within the guard band.

Aspect 26: The method of any of aspects 16 through 25, wherein the one or more conditions for performing communications within the guard band comprise an ACI threshold, an ACLR threshold, or both, and the set of parameters comprises an ACI level that satisfies the ACI threshold, an ACLR that satisfies the ACLR threshold, or both.

Aspect 27: The method of any of aspects 16 through 26, wherein the one or more conditions for performing communications within the guard band comprise one or more duplexing modes, one or more modulation orders, one or more modulation schemes, or any combination thereof, that are enabled for communications within the guard band, and the set of parameters comprise a duplexing mode included within the one or more duplexing modes, a modulation order included within the one or more modulation orders, a modulation scheme included within the one or more modulation schemes, or any combination thereof.

Aspect 28: The method of any of aspects 16 through 27, wherein the one or more conditions for performing communications within the guard band comprise an arrangement of resources within the guard band, the set of parameters comprise the arrangement of resources within the guard band.

Aspect 29: The method of any of aspects 16 through 28, wherein the one or more conditions for performing communications within the guard band comprise an MPR value for messages transmitted by the UE, the set of parameters comprise the MPR value.

Aspect 30: The method of any of aspects 16 through 29, wherein the one or more conditions for performing communications within the guard band comprise one or more waveforms that are enabled for communications within the guard band, the set of parameters comprise a waveform that is included within the one or more waveforms.

Aspect 31: An apparatus comprising one or more processors; one or more memories coupled with the one or more processors; and instructions stored in the one or more memories and executable by the one or more processors to cause the apparatus to perform a method of any of aspects 1 through 15.

Aspect 32: An apparatus comprising at least one means for performing a method of any of aspects 1 through 15.

Aspect 33: A non-transitory computer-readable medium storing code the code comprising instructions executable by one or more processors to perform a method of any of aspects 1 through 15.

Aspect 34: An apparatus comprising one or more processors; one or more memories coupled with the one or more processors; and instructions stored in the one or more memories and executable by the one or more processors to cause the apparatus to perform a method of any of aspects 16 through 30.

Aspect 35: An apparatus comprising at least one means for performing a method of any of aspects 16 through 30.

Aspect 36: A non-transitory computer-readable medium storing code the code comprising instructions executable by one or more processors to perform a method of any of aspects 16 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

one or more memories storing processor-executable code; and one or more processors coupled with the one or more memories and operable to execute the code to cause the one or more processors, individually or collectively, to cause the UE to:

transmit, to a network entity, capability signaling indicating one or more parameters for use in communications within a guard band, wherein the one or more parameters indicate a capability of the UE to perform communications within the guard band in accordance with one or more conditions for performing communications within the guard band;

receive, from the network entity, control signaling indicating a communication frame structure for communications between the UE and the network entity, wherein the communication frame structure comprises the guard band between a first channel and a second channel in a frequency domain;

receive a control message indicating a set of resources for a message between the UE and the network entity, wherein at least a subset of resources of the set of resources are included within the guard band;

receive, via the control signaling, the control message, or both, an indication of the one or more conditions for performing communications within the guard band, an indication of a set of parameters that satisfy the one or more conditions and that are based at least in part on the one or more parameters indicated by the capability signaling, or both, wherein receiving the control signaling, receiving the control message, communicating the message, or any combination thereof, is based at least in part on the capability signaling; and communicate the message with the network entity within the set of resources and in accordance with the set of parameters that satisfy the one or more conditions for performing communications within the guard band.

2. The UE of claim 1, wherein the one or more processors are further configured to cause the UE to:

transmit, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

3. The UE of claim 1, wherein the one or more processors are further configured to cause the UE to:

receive, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

4. The UE of claim 1, wherein the one or more processors are further configured to cause the UE to:

receive, via the control message, one or more frequency domain resource allocation bit field values that indicate the at least the subset of resources that are included within the guard band.

5. The UE of claim 4, wherein a quantity of frequency domain resource allocation bit fields included within the control message is based at least in part on a quantity of resource blocks of the guard band that are available for scheduled communications.

6. The UE of claim 4, wherein each frequency domain resource allocation bit field value of the one or more frequency domain resource allocation bit field values is associated with one or more resource blocks of the guard band.

7. The UE of claim 4, wherein the one or more processors are further configured to cause the UE to:

receive, via the control message, one or more additional bit field values, a scrambled cyclic redundancy check portion, or both, wherein a mapping between the one or more frequency domain resource allocation bit field values and the at least the subset of resources that are included within the guard band is interpreted in accordance with the one or more additional bit field values, the scrambled cyclic redundancy check portion, or both.

8. The UE of claim 1, wherein the control message comprises a downlink control information message that is associated with a downlink control information format for scheduling communications within the guard band.

9. The UE of claim 1, wherein the one or more conditions for performing communications within the guard band comprise an adjacent channel interference threshold, an adjacent channel leakage ratio threshold, or both, and wherein the set of parameters comprises an adjacent channel interference level that satisfies the adjacent channel interference threshold, an adjacent channel leakage ratio that satisfies the adjacent channel leakage ratio threshold, or both.

10. The UE of claim 1, wherein the one or more conditions for performing communications within the guard band comprise one or more duplexing modes, one or more modulation orders, one or more modulation schemes, or any combination thereof, that are enabled for communications within the guard band, and wherein the set of parameters comprise a duplexing mode included within the one or more duplexing modes, a modulation order included within the one or more modulation orders, a modulation scheme included within the one or more modulation schemes, or any combination thereof.

11. The UE of claim 1, wherein the one or more conditions for performing communications within the guard band comprise an arrangement of resources within the guard band, wherein the set of parameters comprise the arrangement of resources within the guard band.

12. The UE of claim 1, wherein the one or more conditions for performing communications within the guard band comprise a maximum power reduction value for messages transmitted by the UE, wherein the set of parameters comprise the maximum power reduction value.

13. The UE of claim 1, wherein the one or more conditions for performing communications within the guard band comprise one or more waveforms that are enabled for communications within the guard band, wherein the set of parameters comprise a waveform that is included within the one or more waveforms.

14. A network entity for wireless communication, comprising:

one or more memories storing processor-executable code; and one or more processors coupled with the one or more memories and operable to execute the code to cause the one or more processors, individually or collectively, to cause the network entity to:

receive, from a user equipment (UE), capability signaling indicating one or more parameters for use in communications within a guard band, wherein the one or more parameters indicate a capability of the UE to perform communications within the guard band in accordance with one or more conditions for performing communications within the guard band;

transmit, to the UE, control signaling indicating a communication frame structure for communications between the UE and the network entity, wherein the communication frame structure comprises the guard band between a first channel and a second channel in a frequency domain;

transmit a control message indicating a set of resources for a message between the UE and the network entity, wherein at least a subset of resources of the set of resources are included within the guard band;

transmit, via the control signaling, the control message, or both, an indication of the one or more conditions for performing communications within the guard band, an indication of a set of parameters that satisfy the one or more conditions and that are based at least in part on the one or more parameters indicated by the capability signaling, or both, wherein transmitting the control signaling, transmitting the control message, communicating the message, or any combination thereof, is based at least in part on the capability signaling; and communicate the message with the UE within the set of resources and in accordance with the set of parameters that satisfy the one or more conditions for performing communications within the guard band.

15. The network entity of claim 14, wherein the one or more processors are further configured to cause the network entity to:

receive, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

16. The network entity of claim 14, wherein the one or more processors are further configured to cause the network entity to:

transmit, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

17. The network entity of claim 14, wherein the one or more processors are further configured to cause the network entity to:

transmit, via the control message, one or more frequency domain resource allocation bit field values that indicate the at least the subset of resources that are included within the guard band.

18. The network entity of claim 17, wherein a quantity of frequency domain resource allocation bit fields included within the control message is based at least in part on a quantity of resource blocks of the guard band that are available for scheduled communications.

19. The network entity of claim 17, wherein each frequency domain resource allocation bit field value of the one or more frequency domain resource allocation bit field values is associated with one or more resource blocks of the guard band.

20. The network entity of claim 17, wherein the one or more processors are further configured to cause the network entity to:

transmit, via the control message, one or more additional bit field values, a scrambled cyclic redundancy check portion, or both, wherein a mapping between the one or more frequency domain resource allocation bit field values and the at least the subset of resources that are included within the guard band is interpreted in accordance with the one or more additional bit field values, the scrambled cyclic redundancy check portion, or both.

21. The network entity of claim 14, wherein the control message comprises a downlink control information message that is associated with a downlink control information format for scheduling communications within the guard band.

22. The network entity of claim 14, wherein the one or more conditions for performing communications within the guard band comprise an adjacent channel interference threshold, an adjacent channel leakage ratio threshold, or both, and wherein the set of parameters comprises an adjacent channel interference level that satisfies the adjacent channel interference threshold, an adjacent channel leakage ratio that satisfies the adjacent channel leakage ratio threshold, or both.

23. The network entity of claim 14, wherein the one or more conditions for performing communications within the guard band comprise one or more duplexing modes, one or more modulation orders, one or more modulation schemes, or any combination thereof, that are enabled for communications within the guard band, and wherein the set of parameters comprise a duplexing mode included within the one or more duplexing modes, a modulation order included within the one or more modulation orders, a modulation scheme included within the one or more modulation schemes, or any combination thereof.

24. The network entity of claim 14, wherein the one or more conditions for performing communications within the guard band comprise an arrangement of resources within the guard band, wherein the set of parameters comprise the arrangement of resources within the guard band.

25. A method for wireless communication implemented by a user equipment (UE), comprising:

transmitting, to a network entity, capability signaling indicating one or more parameters for use in communications within a guard band, wherein the one or more parameters indicate a capability of the UE to perform communications within the guard band in accordance with one or more conditions for performing communications within the guard band;

receiving, from the network entity, control signaling indicating a communication frame structure for communications between the UE and the network entity, wherein the communication frame structure comprises the guard band between a first channel and a second channel in a frequency domain;

receiving a control message indicating a set of resources for a message between the UE and the network entity, wherein at least a subset of resources of the set of resources are included within the guard band;

receiving, via the control signaling, the control message, or both, an indication of the one or more conditions for performing communications within the guard band, an indication of a set of parameters that satisfy the one or more conditions and that are based at least in part on the one or more parameters indicated by the capability signaling, or both, wherein receiving the control signaling, receiving the control message, communicating the message, or any combination thereof, is based at least in part on the capability signaling; and communicating the message with the network entity within the set of resources and in accordance with the set of parameters that satisfy the one or more conditions for performing communications within the guard band.

26. The method of claim 25, further comprising:

transmitting, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

27. The method of claim 25, further comprising:

receiving, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

28. A method for wireless communication implemented by a network entity, comprising:

receiving, from a user equipment (UE), capability signaling indicating one or more parameters for use in communications within a guard band, wherein the one or more parameters indicate a capability of the UE to perform communications within the guard band in accordance with one or more conditions for performing communications within the guard band;

transmitting, to the UE, control signaling indicating a communication frame structure for communications between the UE and the network entity, wherein the communication frame structure comprises the guard band between a first channel and a second channel in a frequency domain;

transmitting a control message indicating a set of resources for a message between the UE and the network entity, wherein at least a subset of resources of the set of resources are included within the guard band;

transmitting, via the control signaling, the control message, or both, an indication of the one or more conditions for performing communications within the guard band, an indication of a set of parameters that satisfy the one or more conditions and that are based at least in part on the one or more parameters indicated by the capability signaling, or both, wherein transmitting the control signaling, transmitting the control message, communicating the message, or any combination thereof, is based at least in part on the capability signaling; and communicating the message with the UE within the set of resources and in accordance with the set of parameters that satisfy the one or more conditions for performing communications within the guard band.

29. The method of claim 28, further comprising:

receiving, via the capability signaling, an indication of a modulation scheme, a modulation order, or both, that is supported by the UE, wherein the message is communicated in accordance with the modulation scheme, the modulation order, or both, and wherein the set of parameters comprise the modulation scheme, the modulation order, or both.

30. The method of claim 28, further comprising:

transmitting, via the control signaling, the control message, or both, a set of transmission time intervals, a set of frequency resources, or both, that are enabled for communications within one or more guard bands, wherein the message is communicated within a transmission time interval of the set of transmission time intervals, within the set of frequency resources, or both.

* * * * *